United States Patent
Asai

(10) Patent No.: US 11,231,839 B2
(45) Date of Patent: *Jan. 25, 2022

(54) PORTABLE TERMINAL CAUSING AN IMAGE PROCESSING DEVICE TO EXECUTE OPERATIONS FOR IMAGE DATA

(71) Applicant: BROTHER KOGYO KABUSHIKI KAISHA, Nagoya (JP)

(72) Inventor: Norihiko Asai, Tajimi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,159

(22) Filed: Dec. 1, 2020

(65) Prior Publication Data

US 2021/0081090 A1    Mar. 18, 2021

Related U.S. Application Data

(63) Continuation of application No. 16/437,349, filed on Jun. 11, 2019, now Pat. No. 10,866,710, which is a
(Continued)

(30) Foreign Application Priority Data

Nov. 27, 2015  (JP) ................................. 2015-231584

(51) Int. Cl.
*G06F 3/0484* (2013.01)
*G06F 3/14* (2006.01)
(Continued)

(52) U.S. Cl.
CPC .......... *G06F 3/0484* (2013.01); *G06F 3/0482* (2013.01); *G06F 3/14* (2013.01);
(Continued)

(58) Field of Classification Search
CPC .......... G06F 3/0484; G06F 3/147; G06F 3/14; G06F 3/0482; H04N 1/00973;
(Continued)

(56) References Cited

U.S. PATENT DOCUMENTS

| 10,218,869 B2 | 2/2019 | Asai | |
| 2012/0154840 A1* | 6/2012 | Kikuchi | H04N 1/00344 358/1.13 |
| 2012/0194531 A1* | 8/2012 | Yanagawa | G06F 3/017 345/543 |
| 2012/0243043 A1 | 9/2012 | Asai | |

(Continued)

FOREIGN PATENT DOCUMENTS

| JP | 2004-234326 A | 8/2004 |
| JP | 2012-203742 A | 10/2012 |

OTHER PUBLICATIONS

Office Action (Notice of Reasons for Refusal) issued in corresponding Japanese Patent Application No. 2019-087989, dated Feb. 4, 2020.

*Primary Examiner* — Jeanette J Parker
(74) *Attorney, Agent, or Firm* — Merchant & Gould P.C.

(57) ABSTRACT

A non-transitory computer-readable medium stores instructions to control a portable terminal to perform processes including: an receiving processing of receiving a user operation; a first determination processing of determining whether device identification information is stored in the storage; performing a first designation processing; a second designation processing; wherein the first designation processing includes: a first specifying processing of specifying the image processing device; a first selection screen display processing of displaying a first selection screen; and, when the user operation of designating the device object is received, a first storing processing, and wherein the second designation processing includes: a second specifying processing of specifying an image processing device; a second selection screen display processing of displaying a second
(Continued)

selection screen; and, when the user operation of designating the device object is received, a second storing processing.

16 Claims, 15 Drawing Sheets

Related U.S. Application Data continuation of application No. 15/350,524, filed on Nov. 14, 2016, now Pat. No. 10,359,915.

(51) Int. Cl.
    *G06F 3/0482*    (2013.01)
    *H04N 1/00*      (2006.01)
    *G06F 3/147*     (2006.01)

(52) U.S. Cl.
    CPC ......... *G06F 3/147* (2013.01); *H04N 1/00973* (2013.01); *G09G 2370/042* (2013.01); *G09G 2370/16* (2013.01); *G09G 2380/06* (2013.01); *H04N 2201/0075* (2013.01); *H04N 2201/0094* (2013.01)

(58) Field of Classification Search
    CPC ... H04N 2201/0094; H04N 2201/0075; G09G 2370/042; G09G 2370/16; G09G 2380/06
    See application file for complete search history.

(56) References Cited

U.S. PATENT DOCUMENTS

| | | |
|---|---|---|
| 2013/0083209 A1* | 4/2013 | Mishima ............ H04N 1/00336 348/207.2 |
| 2013/0104052 A1* | 4/2013 | Chang ................ G06Q 20/3226 715/752 |
| 2013/0260683 A1 | 10/2013 | Suzuki et al. |
| 2014/0094209 A1 | 4/2014 | Ren |
| 2014/0094211 A1 | 4/2014 | Ren |
| 2014/0355048 A1* | 12/2014 | Kang .................... G06F 3/1229 358/1.15 |
| 2015/0116760 A1 | 4/2015 | Kim |
| 2015/0138597 A1* | 5/2015 | Koshigaya ......... H04N 1/00132 358/1.15 |
| 2015/0193674 A1* | 7/2015 | Ishiguro ................ G06F 3/1253 358/1.15 |
| 2015/0317108 A1* | 11/2015 | Hadano ................ G06F 3/1231 358/1.15 |
| 2015/0350468 A1* | 12/2015 | Kodimer ............ H04N 1/00413 358/1.13 |
| 2016/0127581 A1 | 5/2016 | Suzuki |
| 2016/0357405 A1 | 12/2016 | Asai |
| 2017/0094081 A1 | 3/2017 | Sato |
| 2017/0153860 A1 | 6/2017 | Asai |
| 2017/0192724 A1* | 7/2017 | Kim ................... H04N 1/00885 |
| 2017/0374189 A1 | 12/2017 | Asai |
| 2018/0077300 A1 | 3/2018 | Asai |
| 2018/0167523 A1 | 6/2018 | Asai |
| 2018/0210689 A1 | 7/2018 | Asai |
| 2018/0234572 A1 | 8/2018 | Asai |
| 2018/0234581 A1 | 8/2018 | Asai |

* cited by examiner

FIG. 3A

| FAX SPECIFICATION INFORMATION ||| FAX DATA |
|---|---|---|---|
| DATA ID | RECEPTION DATE AND TIME | TRANSMISSION SOURCE TELEPHONE NUMBER | |
| 001 | 2015.06.12 10:15 | xx-xxxx-xxxx | FAX DATA 1 |
| 002 | 2015.07.02 15:34 | yy-yyyy-yyyy | FAX DATA 2 |
| ⋮ | ⋮ | ⋮ | ⋮ |

FIG. 3B

| DEVICE ID | OPERATION ID |
|---|---|
| MFP-A | PRINT, SCAN, FAX TRANSMISSION, FAX RECEPTION, FAX PREVIEW TRANSMISSION, LABEL PRINT |

FIG. 3C

| DESIGNATED OPERATION ID | |
|---|---|

FIG. 3D

| PROGRAM ID | SECOND SUPPORT OPERATION ID |
|---|---|
| 001 | PRINT, FAX TRANSMISSION |
| 002 | PRINT, LABEL PRINT |

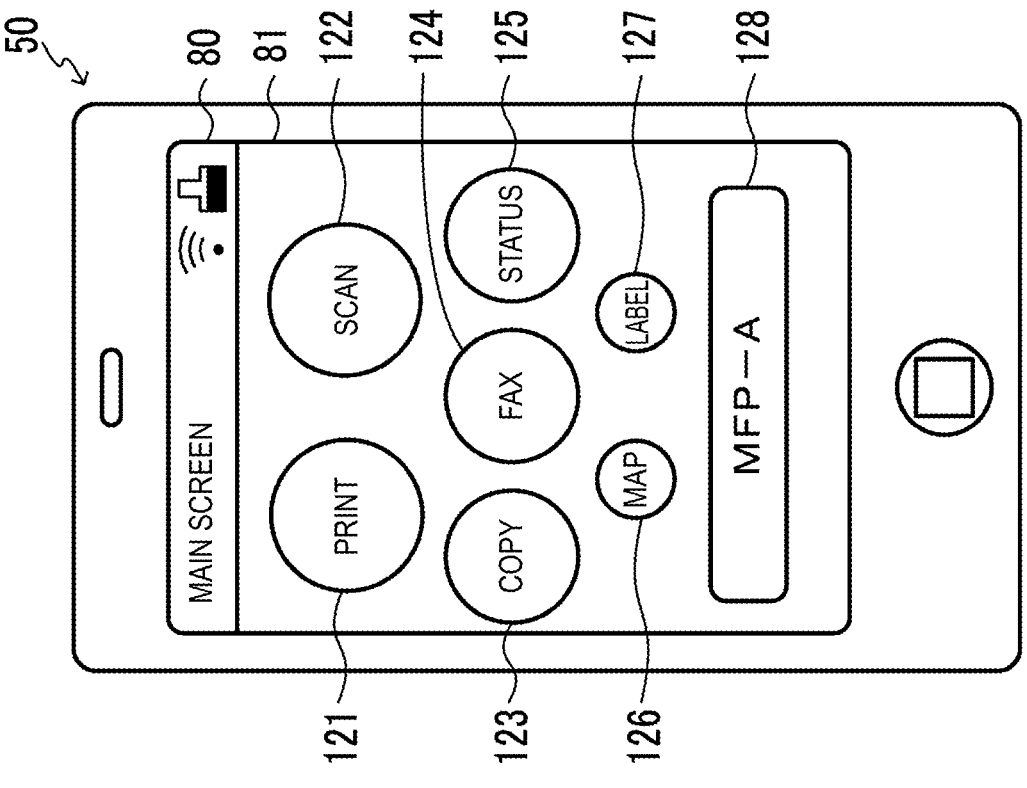
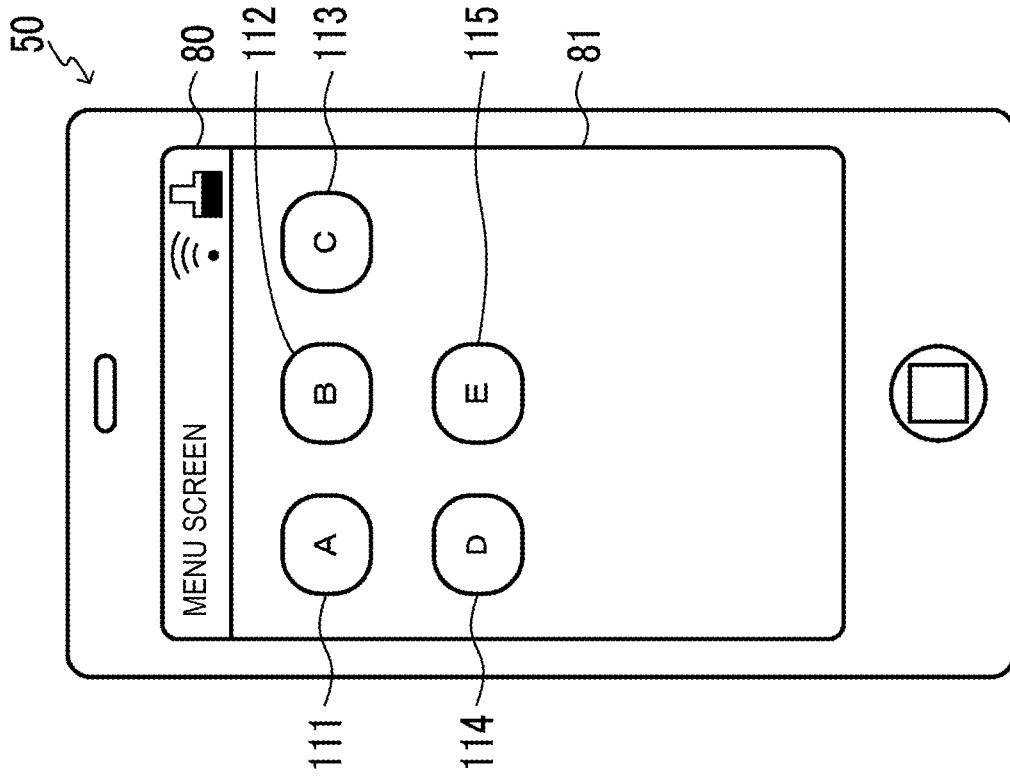

PORTABLE TERMINAL CAUSING AN IMAGE PROCESSING DEVICE TO EXECUTE OPERATIONS FOR IMAGE DATA

CROSS-REFERENCE TO RELATED APPLICATION

This application is a continuation of U.S. patent application Ser. No. 16/437,349, filed Jun. 11, 2019, which is a continuation of U.S. patent application Ser. No. 15/350,524, filed Nov. 14, 2016, which further claims priority from Japanese Patent Application No. 2015-231584 filed on Nov. 27, 2015. The entire subject matter of all applications are incorporated herein by reference.

TECHNICAL FIELD

This disclosure relates to instructions of a program readable by a portable terminal. The instructions of the program cause the portable terminal to execute a processing for causing an image processing device to execute operations for image data.

BACKGROUND

An application, an application, which allows a user to designate content data and causes an image processing device to execute an operation for the designated content data, is known. For example, a background application allows a user to designate image data stored in a portable terminal and causes a printer to print an image represented by the image data.

SUMMARY

An application of a portable terminal is, for example, designed by assuming individual user to easily print an image data and therefore is required for a simple configuration that focuses on implemented functions. The portable terminal which executes the application has a small screen size as compared to a PC or the like and therefore is required for a user interface which simply intuitive operation is available.

In recent years, so-called "a multifunction peripheral (hereinafter referred to as MFP)", in which a printer is equipped with a scanner, a FAX, and the like, has become popular. Then, in order for a user to effectively utilize a function of an MFP, it is required to use an application of a portable terminal as a guide line to guide the user to the functions implemented in the MFP. Further, it is desirable that the application of the portable terminal is further provided with a printer which executes an operation for image data or a user interface which allows a user to select an MFP.

This disclosure is to provide a program having a suitable user interface to select an image processing device which executes an operation for image data.

A non-transitory computer-readable medium of this disclosure stores instructions to control a portable terminal, which has a network interface, a display, a user interface, and a storage, the instructions causing the portable terminal to perform processes including: a first display processing of displaying a first screen including a device designate object and an operation object on the display, wherein the device designate object is corresponding to designation of a designated device which is one of the plurality of image processing device having an execution unit capable of executing an operation for image data, the operation object is corresponding to an operation which is executable by the image processing device; an receiving processing of receiving a user operation that designates an object through the user interface; a first determination processing of determining whether device identification information for identifying the designated device is stored in the storage; a first designation processing of designating a device when the user operation of designating the device designation object is received by the receiving processing; an execution preparing processing of preparing the designated device to execute a designated operation, wherein the designated operation is an operation corresponding to the designated operation object, when the user operation of designating the operation object is received by the receiving processing and it is determined that the device identification information is stored by the first determination processing; and a second designation processing of designating a device when the user operation of designating the operation object is received by the reception processing and it is determined that the device identification information is not stored by the first determination processing; wherein the first designation processing includes processes including: a first specifying processing of specifying the image processing device in which communication is available through the network interface and designation is available as the designated device; a first selection screen display processing of displaying a first selection screen including a device object, which is corresponding to the image processing device specified in the first specification processing, on the display; and a first storing processing of storing the device identification information of the image processing device, which is corresponding to the device object, in the storage, when the user operation of designating the device object is received by the receiving processing, and wherein the second designation processing includes processes including: a second specifying processing of specifying an image processing device capable of executing the designated operation, among the image processing devices in which communication is available through the communication and designation is available as the designated device; a second selection screen display processing of displaying a second selection screen including the device object, which is corresponding to the image processing device specified by the second specification processing, on the display; and a second storing processing of storing the device identification information of the image processing device, which is corresponding to the device object, in the storage, when the user operation of designating the device object is received by the receiving processing.

According to the above configuration, it is possible to provide a first guide line for instructing the designated device, which is selected from among a rich choice, to execute a designation operation by designating a device designation object before designating a designated operation. On the other hand, by designating the operation object before designating the designated device, it is possible to provide a second guide line for instructing the designated device, which is suitable for the designated operation, to execute the designated operation. That is, the user can use properly a first guide line and a second guide line by intuitive operation of firstly designating any one of the device designation object and the operation object, the first guide line is suitable for the user who is operating the terminal program, considering that which one of the designated devices is selected, and the second guide line is suitable for the user who is operating the terminal program, considering the operation to be executed by the designated device.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 3A to 3D are a diagram showing an example of information stored in a data storage area 32B, 62B, FIG. 3A is showing a FAX list, FIG. 3B is showing a designated device information, FIG. 3C is showing a designated operation ID, and FIG. 3D is showing a list of a second support operation ID;

FIGS. 9A and 9B are a diagram showing a display example of the display 53, FIG. 9A is showing a menu screen, and FIG. 9B is showing a main screen;

FIG. 10A is showing a non-selection notification screen 130 which is superimposed on a main screen, and FIG. 10B is showing a device selection screen in a case where an MFPs 10A and 10B are specified;

FIG. 11A is showing a device selection screen in a case where only the MFP 10A is specified, and FIG. 11B is showing a devices selection screen in which operation identification images 137 to 139 are added to device icons 135 and 136;

FIG. 12A is showing a data selection screen, and FIG. 12B is showing a preview screen in a standard activation processing;

FIG. 13A is showing an operation selection screen, and FIG. 13B is showing a FAX transmission screen;

FIG. 14A is showing a FAX selection screen, and FIG. 14B is showing a FAX preview screen.

DETAILED DESCRIPTION

Hereinafter, embodiments of this disclosure will be described with reference to the accompanying drawings. The embodiments described below are merely examples of the present invention. The embodiments of this disclosure can be appropriately changed within a range not changing scope of the present invention. For example, the execution order of each processing to be described later can be suitably changed within a scope without changing scope of the present invention.

Figure 1:
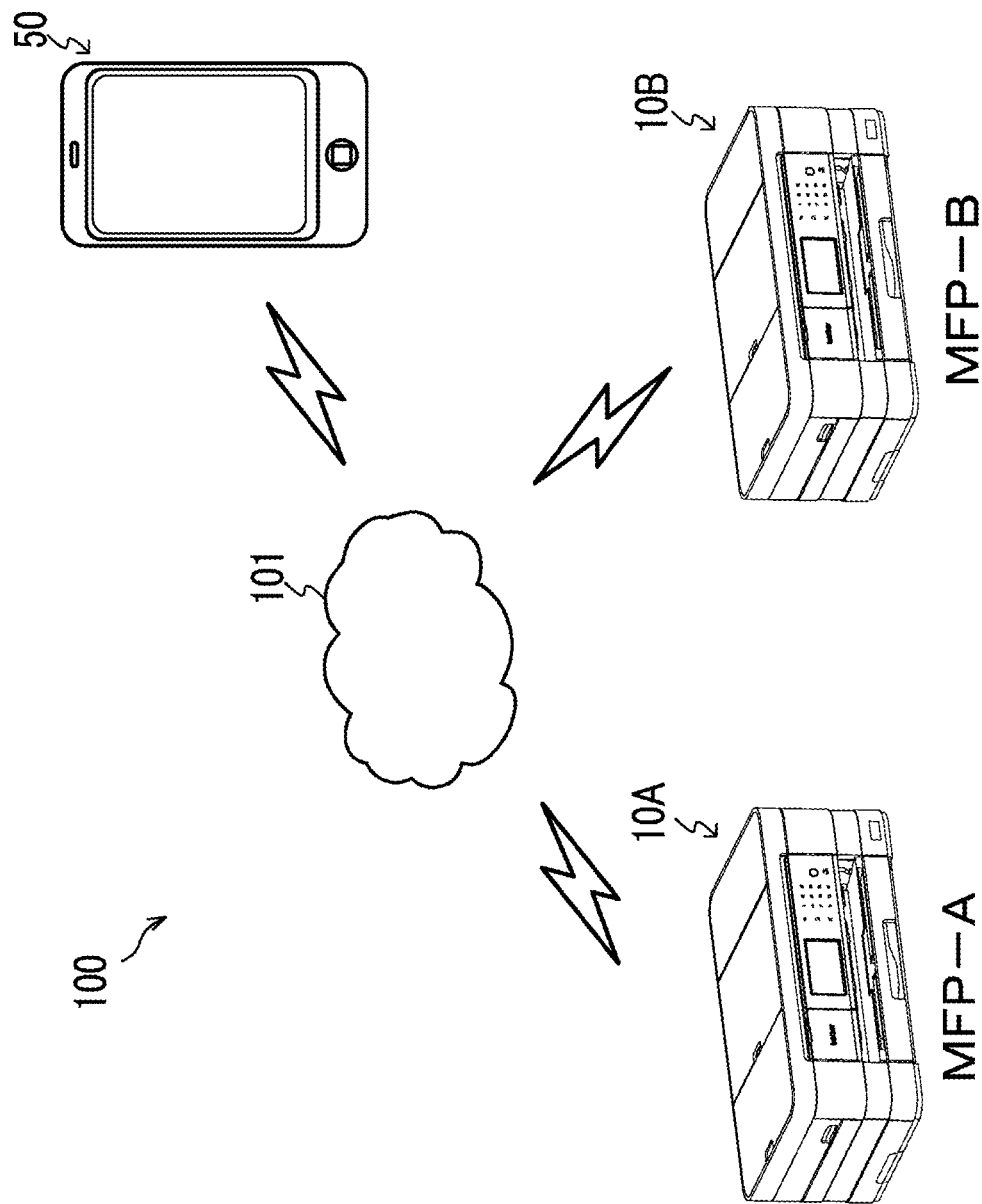
FIG. 1 is a schematic block diagram of a system 100 according to an embodiment.

FIG. 1 is a schematic diagram of a system 100 according to this embodiment. A system 100 illustrated in FIG. 1 includes MFPs 10A and 10B (hereinafter, these are collectively sometimes referred to as "an MFP 10") and a portable terminal 50. An MFP 10 and a portable terminal 50 are configured to be capable of communicating through a communication network 101. The communication network 101 may be, for example, a cable LAN 31, a wireless LAN, or a combination thereof.

Figure 2A:
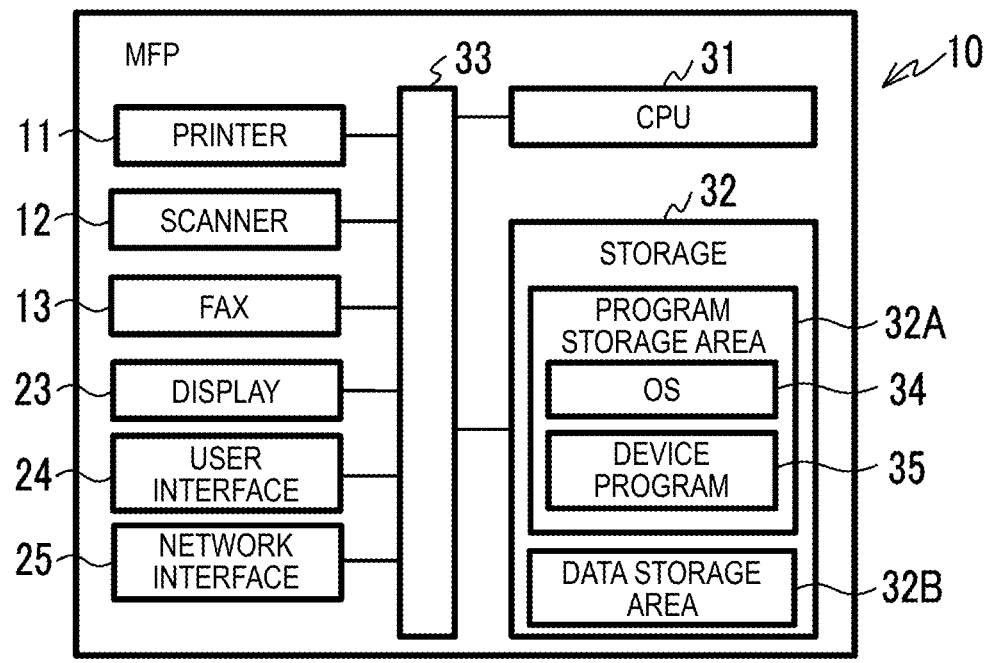
FIG. 2A is a block diagram of the MFP 10.

The MFP 10 mainly includes, as illustrated in FIG. 2A, a printer 11, a scanner 12, a FAX 13, a display 23, a user interface 24, a network interface 25, a CPU 31, a storage 32 and a communication bus 33. Components forming the MFP 10 are connected to each other through a communication bus 33. The MFP 10 is an example of an image processing device.

The printer 11 executes a printing operation for recording an image represented by image data on a recording sheet. The recording sheet is an example of a sheet or recording medium. As a recording method of the printer 11, a well-known method such as an inkjet method or an electro photo graphic method can be employed. The scanner 12 executes a scanning operation for generating image data by reading an image recorded on a document. The FAX 13 executes a FAX transmission operation and a FAX reception operation for transmitting and receiving image data in a manner conforming to a FAX protocol. The printer 11, the scanner 12, and the FAX 13 are an example of the execution unit.

The printing operation and the FAX transmission operation among the plurality of operations described above is an example of an output operation that outputs the image data. An output operation which the MFP 10 executes is not limited thereto. As other examples of the output operation, the MFP 10 may execute the FAX preview transmission operation of transmitting the subject image data to the portable terminal 50 through the network interface 25 in order to display an image indicated by an image data received by the FAX reception operation. As another example of the output operation, the MFP 10 may execute a label printing operation in which a disk-shaped image (hereinafter referred to as a label image) records on a surface of the CD-ROM and the like. The scan operation and the FAX reception operation among the plurality of operations described above are an example of an image forming operation of forming an image data. In addition, the FAX transmission operation and the FAX reception operation are executed by the FAX 13.

Further, the MFP 10 may be capable of executing complex operations by combining a plurality of operations. For example, a copy operation of recording an image data generated by the scanning operation on a recording sheet with using the printing operation, a scan FAX operation for transmitting the image data generated by the scanning operation with using the FAX transmission operation, and a FAX printing operation for recording the image data received by a FAX receiving processing on a recording sheet with using the printing operation are an example of a combined operation.

Operations that the MFPs 10A, 10B can execute may be different. The MFP 10A according to this embodiment may execute a printing operation, a scanning operation, a FAX transmission operation, a FAX reception operation, a FAX preview transmission operation, and a copy operation. On the other hand, the MFP 10B according to this embodiment may execute a printing operation, a scanning operation, and a copy operation. Further, the image processing device is not limited to being capable of executing a plurality of operations, but may be capable of executing only a single operation.

In an MIB of the MFP 10, for example, a device ID for identifying the MFP 10, and an operation ID for identifying an operation which the MFP 10 can execute may be defined. The device ID is an example of device identification information, and the operation ID is an example of the operation identification information. In the present embodiment, the MFP 10A is identified by device ID "MFP-A", and the MFP 10B is identified by device ID "MFP-B". Hereinafter, the device ID and the operation ID registered in the MIB may be referred to as "device information".

A display 23 includes a display screen for displaying various types of information. As the display 23, a liquid crystal display and an organic EL display may be employed.

A user interface 24 is manipulated by a user to designate an object displayed on the display screen of the display 23. More specifically, the user interface 24 has buttons, and outputs various types of operation signals that are associated to the pressed buttons to the CPU 31. Further, the user interface 24 may have a film-like touch sensor superimposed on the display screen of the display 23. That is, the display 23 may be configured as a touch panel display.

An "object" refers to an image that can be designated by operating the user interface 24 by a user. As an example, the object may be a character string, an icon, a button, a link or the like displayed on the display 23. The object may be designated by pressing a direction key or an enter button of the user interface 24. If the user interface 24 is a touch panel, the object displayed on the display 23 may be designated by touching a display position.

The user interface 24, which is realized as a touch panel, outputs position information indicating a position on the display screen that the user touches. Incidentally, the "touch" in the present specification includes general operation of contacting the input medium on the display screen. That is, tap operation to separate the touched input medium from the display screen within a predetermined time, long touch operation, slide operation to slide the touched input medium on the display screen, flick operation, pinch operation, pinch out operation or the like are an example of touch.

Further, even if an input medium is not touching a display screen, a case that distance between the input medium and the display screen is brought close to the input medium to negligible position may be included in the concept of "touch" described above. The input medium may be a user's finger, a touch pen or the like. Hereinafter, tap of the position of the icon displayed on the display 53 will be described as an example of a user operation of designating the icon.

A network interface 25 is an interface for communicating with an external device through the communication network 101. That is, the MFP 10 outputs various types of information to the portable terminal 50 through the network interface 25, receives various types of data or various types of information from the portable terminal 50 through the network interface 25. Specific communication procedure of the network interface 25 is not particularly limited, but, for example, Wi-Fi (registered trademark of Wi-Fi Alliance) may be employed.

A CPU 31 is to control the overall operations of the MFP 10. The CPU 31 acquires and executes the later-described various programs from a storage 32 based on various types of information output from the user interface 24, various types of information acquired from the external device through the network interface 25 and the like. That is, the CPU 31 and the storage 32 form an example of the control unit.

A storage 32 includes a program storage area 32A and a data storage area 32B. In the program storage area 32A, an OS 34 and a device program 35 is stored. The device program 35 may be a single program, or may be a collection of multiple programs. In the data storage area 32B, data or information needed to execute the device program 35 is stored.

The "data" and "information" in the present specification are common in that "data" and "information" are computer readable bit or bit sequence. The "data" refers to data that can be handled by the computer without considering a meaning that each bit represents. In contrast, the "information" refers to information that operations of the computer are branched according to a meaning that each bit represents. Further, the "instruction", which is a control signal for prompting a next operation to a destination device to be transmitted, may contain information or may have a property as information in itself.

Moreover, format of "data" and "information" may be changed for each computer (for example, text format, binary format, or flag format), but as long as "data" and "information" having changed format are recognized as the same meaning, respectively, the "data" and "information" are treated as the same data and information. For example, information of indicating "two" may be retained in some computers as information in a text format "0×32" with using the ASCII code, or may be retained in the other computers as information in binary form "10" with using binary notation.

However, distinction between "data" and "information" described above is not critical and also exceptional handling between "data" and "information" is acceptable. For example, data may be temporarily treated as information, and information may be temporarily treated as data. Furthermore, the data, which is treated as data in some devices, may be treated as information in other devices. Furthermore, information may be extracted from data, and data may be extracted from information.

The storage 32 is formed by, for example, a RAM, a ROM, an EEPROM, a HDD, and a buffer included in a CPU 31 or a combination thereof.

The storage 32 may be a computer readable storage medium. The computer readable storage medium is a Non-transitory medium. The Non-transitory medium includes a recording medium such as a CD-ROM and a DVD-ROM in addition to the above example. Further, the Non-transitory medium is also a tangible medium. On the other hand, an electrical signal for conveying a program downloaded from a server on the Internet is a the computer readable signal medium which is a type of computer readable medium, but is not included in a Non-transitory storage medium that computer can read out.

A program stored in a program storage area 32A is executed by CPU 31. However, in this specification, the operation of each program will be described with omitting the CPU 31. That is, in the following description, an expression that "a program A executes a processing A" may refer to an expression that the "CPU 31 executes a processing A described in a program A". The same applies to the portable terminal 50 to be described later.

A program stored in the program storage area 32A determines events and operates according to the determination result. However, in this specification, the operation of each program will be described with omitting the determination.

That is, in the following description, an expression that "a program executes a processing A according to a condition A" may refer to an expression that "a program determines whether a condition A. The program executes a processing A in response to a positive determination". The same applies to the portable terminal 50 to be described later.

A program stored in the program storage area 32A identifies, acquires extracts, determines, or selects the data or the like. An expression that a program specifies data refers to, for example, a processing that a program specifies data which is matching a condition from among a plurality of data, and stores data in itself or information for identifying the data in a storage area which is predetermined. The information for identifying the data is, for example, identification information for identifying data, an index of an array in which the data is stored, a pointer of a storage area in which the data is stored, or the like. A processing that a program acquires, extracts, determines, or select data is also the same. The same applies to the portable terminal 50 to be described later.

An OS 34 includes basic programs that provide APIs for controlling a printer 11, a scanner 12, a FAX 13, a display 23, the user interface 24, and a network interface 25 which forms the MFP 10. In other words, each of the above programs controls each of hardware by calling the API that OS 34 provides. However, in this specification, an operation of each program will be described with omitting the OS 34. That is, in the following description, an expression that "a program B controls a hardware C" may refer to an expression that "a program B controls a hardware C through an API of the OS 34". The same applies to the portable terminal 50 to be described later.

As illustrated in FIG. 3A, FAX specification information and FAX data corresponding to the FAX specification information can be stored in the data storage area 32B. Hereinafter, the whole information illustrated in FIG. 3A sometimes referred to as "FAX list", and a set of the FAX specification information and the FAX data which are associated with each other in a FAX list may be referred to as "FAX record". That is, the FAX list may include a plurality of FAX records. FIG. 3A shows an example of a FAX list of the MFP 10A.

The FAX data is image data which an MFP 10A receives from the external device through a FAX 13. The FAX specification information is information for specifying individually FAX data to an MFP 10A. The FAX specification information includes, for example, a data ID which is data identification information for identifying the FAX data to an MFP 10A, the reception date of the FAX data identified by the data ID, and transmission-source telephone number which specifies transmission source of FAX data identified by the data ID.

A device program 35 of the MFP 10A adds a FAX record to a FAX list in response to executing the FAX reception operation. More specifically, the device program 35 receives the FAX data and the transmission-source telephone number from an external device through a FAX 13 by FAX reception operation. The device program 35 generates a unique data ID in the FAX list and obtains the reception date and time from a system clock (not illustrated) in response to executing the FAX reception operation. And, the device program 35 adds a FAX record that contains these to the FAX list. The FAX reception operation is automatically executed by the MFP 10A regardless of the instructions from the portable terminal 50.

The device program 35 may read, edit, or delete the data stored in the data storage area 32B by executing an access API provided by the OS 34. In the access API, a data ID for identifying the data to be accessed is designated as a fact. The data ID is information in the form of being used to designate data to the access API. The data ID is, for example, a file path or URI. On the other hand, part or all of the data stored in the data storage area 32B may be stored in an external server (not illustrated) such as a cloud server. That is, a device program 35 may transmit various types of data to the external server through the network interface 25, and receive various types of data from the external server through the network interface 25. In this case, the data ID may be, for example, in the form of URL for downloading data from an external server. The same applies to the portable terminal 50.

Figure 2B:
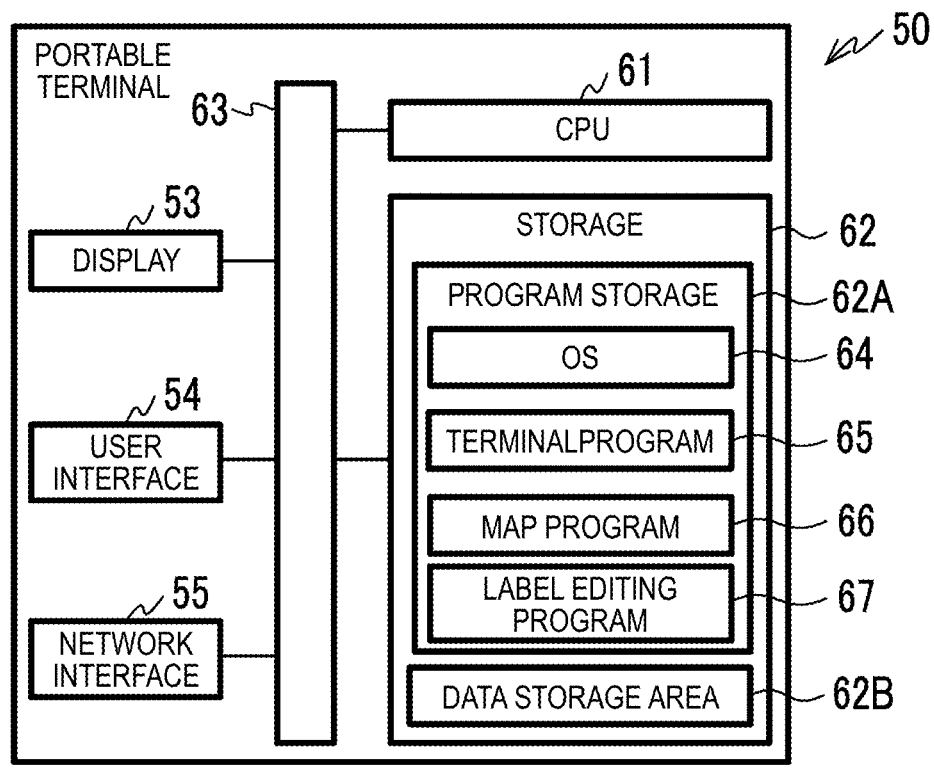
FIG. 2B is a block diagram of a portable terminal 50.

The portable terminal 50 mainly includes, as illustrated in FIG. 2B, a display 53, a user interface 54, a network interface 55, a CPU 61, a storage 62 and a communication bus 63. The display 53, the user interface 54, the network interface 55, the CPU 61, the storage 62, and the communication bus 63 which are included in the portable terminal 50 have the same structure as the display 23, the user interface 24, the network interface 25, the CPU 31, the storage 32, and the communication bus 33 which are included in the MFP 10, and therefore description thereof is omitted. The CPU 61 and the memory unit 62 are an example of a control unit.

The portable terminal 50 is, for example, a mobile phone, a smart phone, or a tablet terminal, and the like. More specifically, the display 53 of the portable terminal 50 has a size of the display screen of preferably 12 inches or less, and more preferably 8 inches or less. The user interface 54 of the portable terminal 50 is preferably the touch panel which is superimposed on the display screen of the display 53.

The display 53 of the portable terminal 50 includes a common display area 80 and a program display area 81 as illustrated in FIGS. 9 to 15. On the common display area 80, a status bar is displayed by the OS 64 regardless of the display contents of the program display area 81. On the status bar, various kinds of information are displayed by the OS 64. On the status bar, for example, a title of a screen displayed in the program display area 81, an icon indicating the battery remaining amount of the portable terminal 50, an icon indicating the communication status of the network interface 55, and an icon indicating a push notification that the portable terminal 50 receives from an external service are displayed. On the program display area 81, a screen generated by a program that is executed in a foreground is displayed.

Hereinafter, when describing "the program displays a screen on the display 53", it is assumed that a program screen is displayed on the program display area 81 and a status bar is displayed on the common display area 80. The program screen is a screen displayed on the program display area 81 by an instruction of the program. However, the display 53 may switch between a part-screen mode in which a display area is divided into a program display area 81 and a common display area 80 and a full-screen mode in which all the display areas are the program display area 81.

The program storage area 62A of the storage 62 stores an OS 64, a terminal program 65, a map program 66, and a label editing program 67. The data storage area 62B stores various types of information illustrated in FIGS. 3B to 3D. Further, the data storage area 62B may be provided with a data folder. In the data folder, for example, photographic data, document data, presentation data, or spreadsheet data may be stored.

The OS 64 may be, for example, an Android (Registered trademark of Google inc.) OS, an iOS (Registered trademark of Cisco Systems, Inc.), an Operating System, or a Windows Phone (Registered trademark of Microsoft Corporation). The OS 64 can execute in parallel a plurality of programs installed in the portable terminal 50. The plurality of programs is executed virtually and in parallel, for example, by a time division multiplexing scheme. Further, the OS 64 executes one of a plurality of programs which are executed in parallel in the foreground, and executes other programs in the background.

The terminal program 65 is a program for causing the designated device to execute the designated operation for the designated data. The designation data refers to image data designated by a user. The designation operation refers to an operation designated by a user. The designated device refers to an MFP 10 designated by a user. The terminal program 65 can receive a user operation of designating designated data, designated operation, and a designated device through the user interface 54. Hereinafter, the data identification information of identifying the designated data is referred to as "designated data ID", the operation identification information of identifying the designated operation is referred to as "designated operation ID", the device identification information of identifying the designated device is referred to as "designated device ID".

The terminal program 65 supports one or more operations. An operation which the terminal program 65 supports is an example of a first support operation. That is, the first support operation refers to an operation in which the terminal program 65 can execute an execution preparing processing to be described later. In other words, the first support operation refers to an operation that may be designated operation. The first support operation according to the present embodiment is a printing operation, a scanning operation, a copy operation, a FAX transmission operation, and a FAX preview transmission operation. The operation ID of the first support operation may be referred to as "the first support operation ID".

The terminal program 65 is activated by the OS 64 of receiving the user operation for the menu screen to be described later, or by a map program 66 or a label editing program 67. Furthermore, the terminal program 65 activates the map program 66 and the label editing program 67 by executing a plug-in API to activate an application as a plug-in. Hereinafter, the map program 66 and the label editing program 67 activated by a plug-in API may be referred to as "plug-in".

The map program 66 and the label editing program 67 are activated by the OS 64, which are an example of an activating source program of activating the terminal program 65 by executing an explicit shared API that uses the designation information as an argument. The map program 66 and label editing program 67 are activated by the terminal program 65 as so-called plug-in, which are an example of an external instructions that provides designated information to the terminal program 65 as a return value of the plug-in API. In addition, the map program 66 and the label editing program 67 may execute the plug-in API that uses the designated information as an argument, and activate the terminal program 65. The designation information includes at least one of a designation data ID, a designated operation ID, and a designated device ID.

The Map program 66 according to this embodiment allows a user to designate any area of the map image, stores the image data representing the map image of the designated area in the data storage area 32B, and provides the data ID of the stored image data to the terminal program 65 as the designated data ID. The map program 66 allows a user to designate one of the printing operation and the FAX transmission operation, and provides the operation ID of the designated operation to the terminal program 65 as a designated operation ID.

The label editing program 67 according to the present embodiment edits a label image in accordance with a user operation, stores the label image data indicating the label image to the data storage area 32B, and provides the data ID of the stored label image data to the terminal program 65 as the designated data ID. The label editing program 67 allows a user to designate one of the printing operation and the label printing operation, and provides the operation ID of the designated operation to the terminal program 65 as a designated operation ID.

An operation which the map program 66 and the label editing program 67 support is an example of a second support operation. The second support operation of the map program 66 according to the present embodiment is a printing operation and a FAX transmission. That is, the second support operation refers to an operation which can be an operation that causes the designated device to execute with respect to the designated data which is designated by a user operation to the plug-in. The second support operation of the label editing program 67 according to the present embodiment is a printing operation and a label printing operation. Hereinafter, the operation ID of the second support operation can be referred to as "second support operation ID".

The OS 64 activates the second program that the first program designates, and provides a shared function of providing the designated information that the first program designates to the second program, to the program installed in the portable terminal 50. The first program can utilize a shared function, for example, by executing API (hereinafter, referred to as "shared API") which the OS 64 provides. More specifically, the first program executes the shared API, with using the program ID and the designation information of the second program as an argument. A shared function of Android OS is an example of a shared function.

When instructing a user to use the shared function, an application of shared source may activate the predetermined shared destination application by executing an explicit share API that uses information, URI, type, and action of specifying a predetermined application as arguments. The URI is information indicating a location of the shared data. The type is information indicating a data format of the shared data. The action is information of indicating a type of processing (for example, viewing, editing, transmitting, or printing) for the shared data to be executed by the shared destination application. The URI, type, and action are an example of designation information provided from the shared source application to the shared destination application.

In the present embodiment, for example, the map program 66 which is a shared source application may be set to the terminal program 65 as a predetermined shared destination application. More particularly, in the setting file which serves as a reference when a map program 66 starts, or the source code of a map program 66, information of specifying the terminal program 65 may be described. The same applies to the label editing program 67, which is another example of a shared source application.

Further, when receiving a user operation of instructing use of a shared function through the user interface 54, the shared source application may execute an implicitly shared API which uses URI, type, and action as arguments. As a result, the OS 64 may display a list of applications on the display 53 and activate an application designated by a user from the list, and here the list is a list of applications which are declaring to OS 64 that the processing, which is illustrated in the action for the shared data of the data format to be indicated by the type, is executable, among the applications that are installed in the portable terminal 50.

The data storage area 62B can store designated device information as illustrated in FIG. 3B. The designated device information includes a device ID for identifying the designated device, and an operation ID of identifying an operation which the designated device can execute. The operation ID that is included in the designated device information is an example of the designated operation ID. The designated device information is stored in the data storage area 62B by a terminal program 65. The designated device information is may be stored or may not be stored in the data storage area 62B, at the beginning of the standard activation processing and the external activation processing to be described later.

The data storage area 62B can store the designated operation ID as illustrated in FIG. 3C. The designated operation ID is temporarily stored in the data storage area 62B by the terminal program 65 that receives a user operation of designating a designated operation. The designated operation ID is not stored in the data storage area 62B at the beginning of the standard activation processing and the external activation processing.

The data storage area 62B, as illustrated in FIG. 3D, can store a program ID of identifying a program, and a second support operation ID associated with the program ID. In the example of FIG. 3D, the program ID "001" identifies the map program 66, and the program ID "002" identifies the label editing program 67. The program ID and the second support operation ID which are corresponding to one another may be stored in the data storage area 62B at the time of installation of the terminal program 65, or may be stored in the data storage area 62B at the time of installation of the map program 66 and the label editing program 67.

[Operation of System 100]

Referring to FIGS. 4 to 8, an operation of a system 100 according to the present embodiment will be described.

First, an OS 64 of the portable terminal 50 displays a menu screen on the display 53. FIG. 9A is showing an example of a menu screen. The menu screen illustrated in FIG. 9A includes a plurality of program icons 111, 112, 113, 114, and 115. The program icons 111 to 115 are corresponding to a program installed in the portable terminal 50. For example, the program icon 111 is corresponding to the terminal program 65, the program icon 112 is corresponding to the map program 66, and the program icon 113 is corresponding to the label editing program 67.

Figure 4:
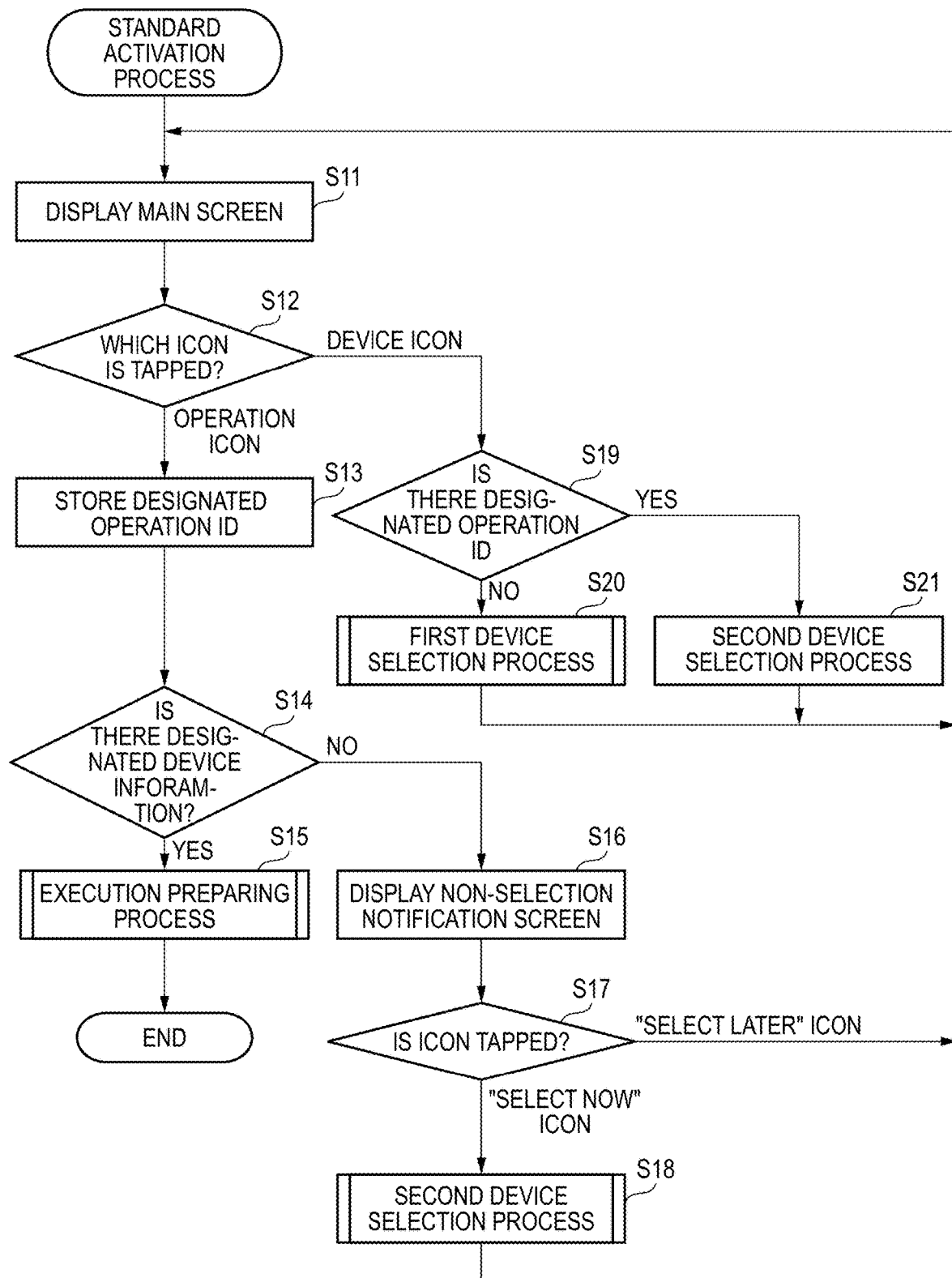
FIG. 4 is a flow chart of the standard activation processing.
Figure 5:
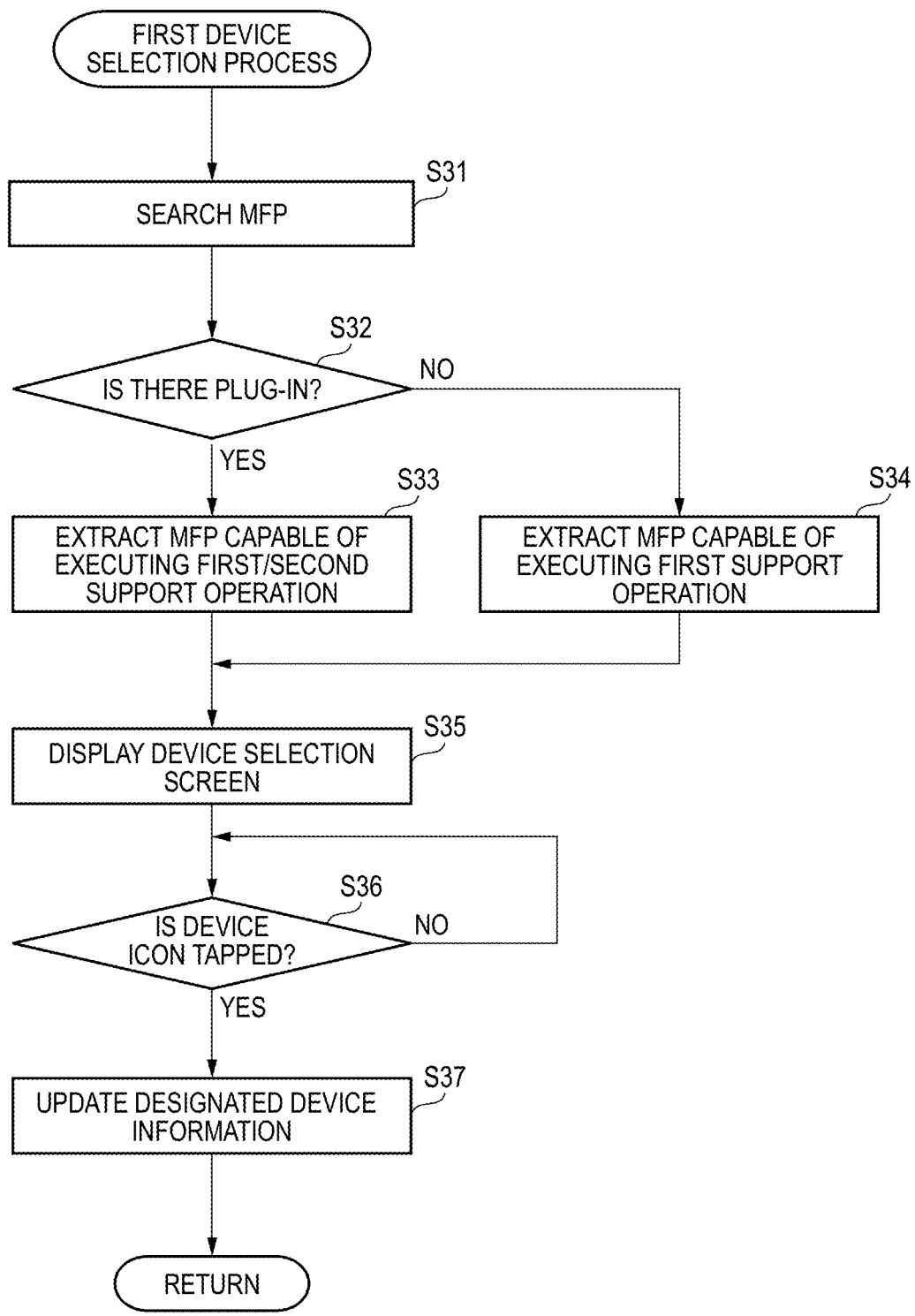
FIG. 5 is a flow chart of a first device selection processing.
Figure 6A:
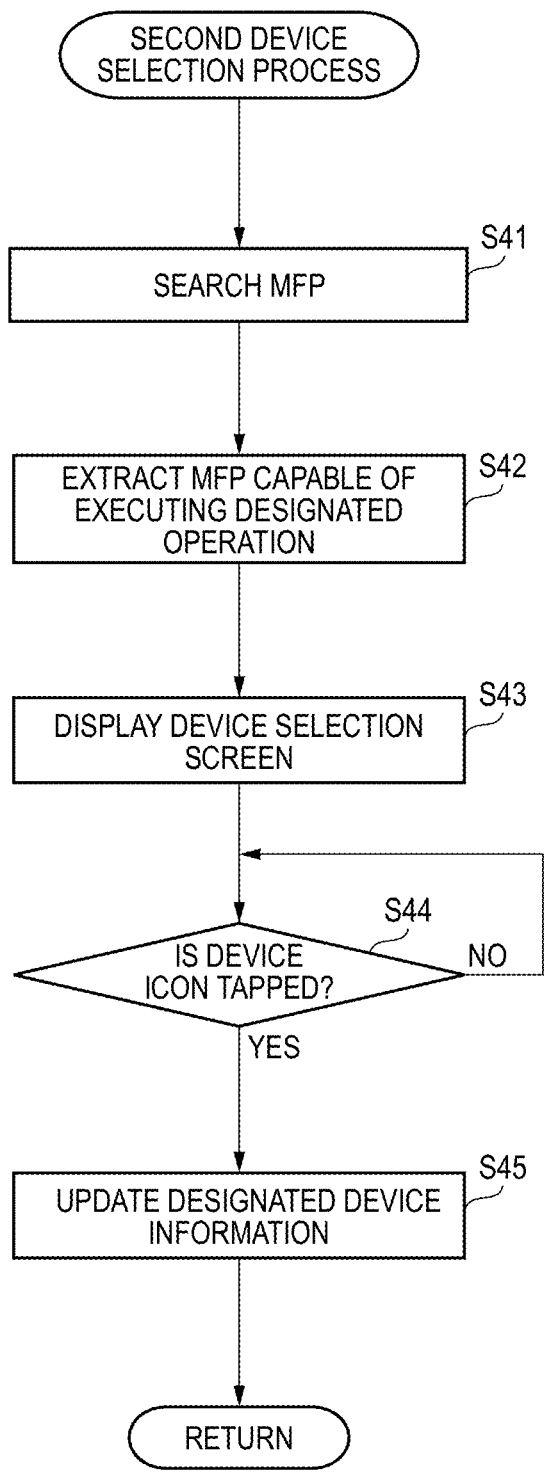
FIG. 6A is a flow chart of a second device selection processing.
Figure 6B:
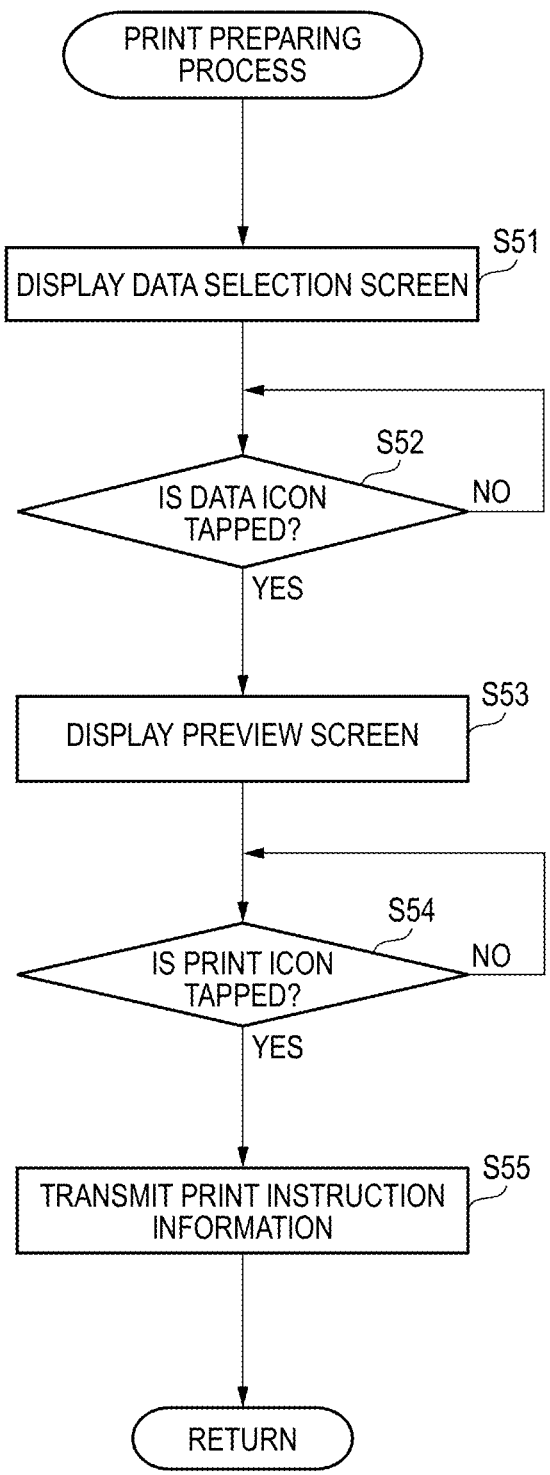
FIG. 6B is a flowchart of a print preparing processing.
Figure 7:
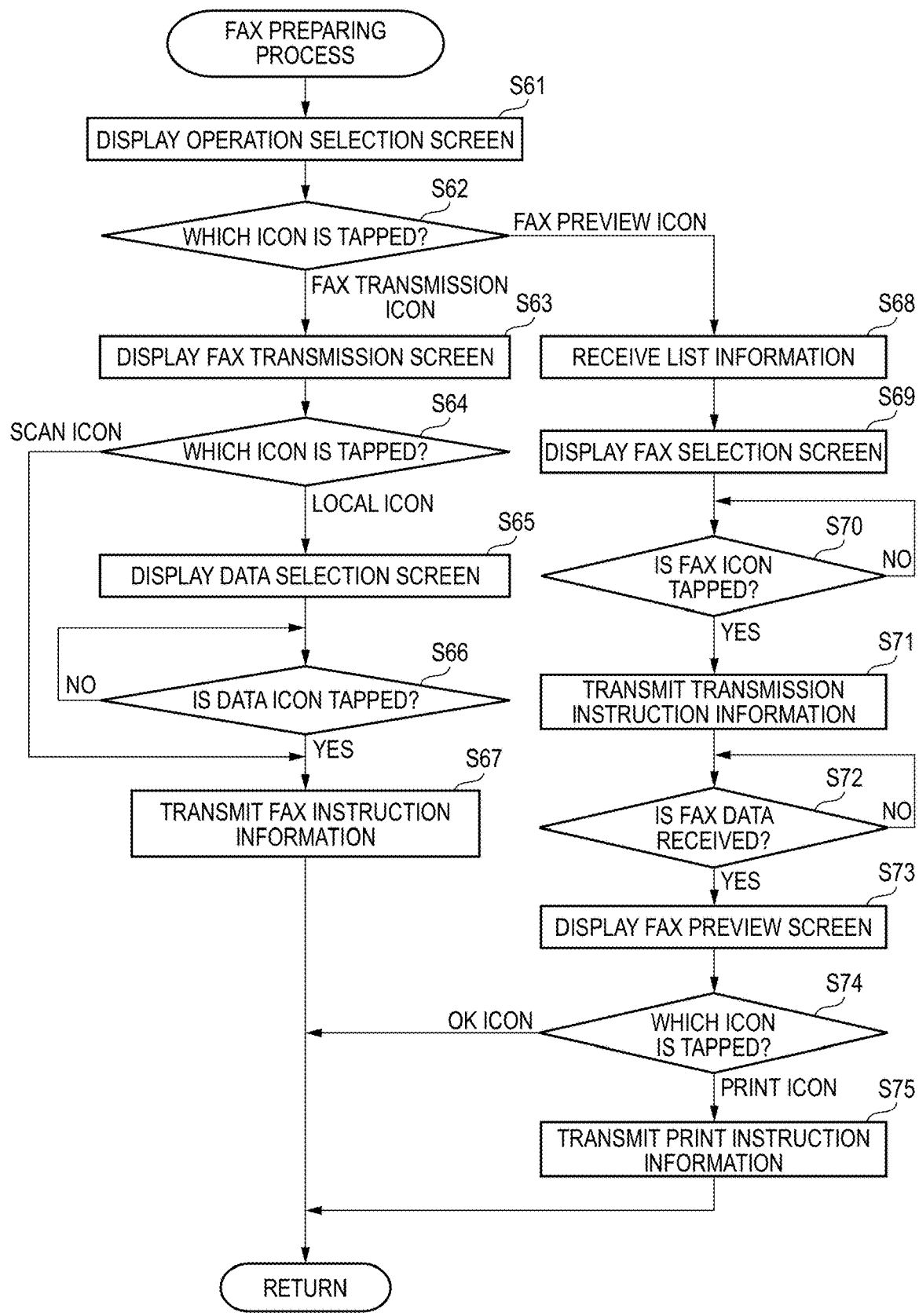
FIG. 7 is a flow chart of a FAX preparing processing.

The OS 64 receives designation of one of the program icons 111 to 115 through the user interface 54. When receiving designation of a program icon 111 through the user interface 54, the OS 64 activates the terminal program 65. The designation of the program icon 111 is an example of a user operation of instructing activation of the terminal program 65. When being activated from the OS 64, the terminal program 65 of the portable terminal 50 executes a standard activation processing. Referring to FIG. 4, the details of the standard activation processing will be described.

[Standard Activation Processing]

First, the terminal program 65 displays the main screen, which is an example of a first screen, on the display 53 (S11). FIG. 9B is showing an example of the main screen. The main screen includes operation icons 121, 122, 123, and 124, and a status icon 125, plug-in icons 126 and 127, and a device icon 128. Further, the terminal program 65 receives a user operation onto the main screen through the user interface 54 (S12). The processing of step S11 is an example of a first display processing, and the processing of step S12 is an example of a reception processing.

The operation icon 121 is an example of an operation object which is corresponding to the printing operation. The operation icon 122 is an example of an operation object which is corresponding to the scanning operation. The operation icon 123 is an example of a combined operation object which is corresponding to a copy operation in which the printing operation and the scanning operation is combined. The operation icon 124 is an example of an inclusion object which is corresponding to both of the FAX transmission operation and the FAX preview transmission operation. The status icon 125 is corresponding to an instruction to display the status screen that shows the status of the designated device. For details of the status screen, a description thereof will be omitted. The plug-in icon 126 is corresponding to an instruction to activate the map program 66 by executing the plug-in API. The plug-in icon 127 is corresponding to an instruction to activate the label editing program 67 by executing the plug-in API.

The terminal program 65 determines whether to include any operation icon in the main screen among the operation icons 121 to 124 which are corresponding to the support operation ID, based on the designated device information stored in the data storage area 62B. More specifically, the terminal program 65 includes the operation icon, which is corresponding to the operation ID included in the designated device information, in the main screen among the operation icons 121 to 124 which can be displayed on the display 53. On the other hand, when the designated device information is not stored in the data storage area 62B, the terminal program 65 includes the operation icons 121 to 124, which are corresponding to all of the support operation ID, in the main screen.

That is, when the operation ID "Print" is included in the designated device information, the terminal program 65 includes the operation icon 121 in the main screen. On the other hand, when the operation ID "Print" is not included in the designated device information, the terminal program 65 does not include the operation icon 121 in the main screen. Similarly, when the operation ID "Scan" is included in the designated device information, the terminal program 65 includes the operation icon 122 in the main screen. On the other hand, when the operation ID "Scan" is not included in the designated device information, the terminal program 65 does not include the operation icon 122 in the main screen.

When both of the operation ID "Print" and the operation ID "Scan" are included in the designated device information, the terminal program 65 includes the operation icon 123 in the main screen. On the other hand, when at least one of the operation ID "Print" and the operation ID "Scan" is not included in the designated device information, the terminal program 65 does not include the operation icon 123 in the main screen.

The printing operation is an example of a first operation, and the scanning operation is an example of a second operation, the operation ID "Print" is an example of the first operation information, and the operation ID "Scan" is an example of the second operation information.

When at least one of the operation ID "FAX transmission" and the operation IDs "FAX preview transmission" is included in the designated device information, the terminal program 65 includes the operation icon 124 in the main screen. On the other hand, when both of the operation ID "FAX transmission" and the operation ID "FAX preview transmission" are not included in the designated device information, the terminal program 65 does not include the operation icon 124 in the main screen. The FAX transmission operation is an example of a third operation, The FAX preview transmission operation is an example of a fourth operation, the operation ID "FAX transmission" is an example of third operation information, and the operation ID "FAX preview transmission" is an example of fourth operation information.

When the map program 66 is installed in the portable terminal 50, the terminal program 65 includes a plug-in icon 126 in the main screen. On the other hand, when the map program 66 is not installed in the portable terminal 50, the terminal program 65 does not include a plug-in icon 126 in the main screen. Similarly, when the label editing program 67 is installed in the portable terminal 50, the terminal program 65 includes a plug-in icon 127 in the main screen. On the other hand, when the label editing program 67 is not installed in the portable terminal 50, the terminal program 65 does not include a plug-in icon 127 in the main screen.

The device icon 128 is an example of a device designation object corresponding to designation of a designated device which is one of MFPs 10A and 10B. When the designated device information is stored in the data storage area 62B, as illustrated in FIG. 9B, the terminal program 65 describes the device ID "MFP-A", which is included in the designated device information, in the device icon 128 as the designated device ID at present. On the other hand, when the designated device information is not stored in the data storage area 62B, the terminal program 65 describes the strings of "Unselected" indicating that no designated device is designated at present in the device icon 128.

Then, when receiving designation of one of designated operation icons 121 to 124 through the user interface 54 (S12: Operation icon), the terminal program 65 temporarily stores an operation ID, which is corresponding to the designated operation icon, in the data storage area 62B as the designated operation ID (S13). Further, when receiving designation of one of the plug-in icons 126 and 127 through the user interface 54, the terminal program 65 temporarily stores a second support operation ID of the program, which is corresponding to the designated plug-in icon, in the data storage area 62B as the designated operation ID (S13).

The designated operation ID, which is stored in step S13, is held in the data storage area 62B, until the execution instruction processing to be described later is executed, until other operation icons 121 to 124 or a plug-in icon 126 is designated, or until the terminal program 65 is ended. A user operation for designating the operation icon is an example of a user operation of designating the designated operation. The processing of step S13 is an example of a third storing processing.

Then, the terminal program 65 determines whether the designated device information is stored in the data storage area 62B (S14). A case where the designated device information is stored in the data storage area 62B is, for example, a case where a first device selection processing or a second device selection processing to be described later is executed in the past. On the other hand, a case where the designated device information is not stored in the data storage area 62B is, for example, a case where the first device selection processing or the second device selection processing is not executed in the past once. The processing of step S14 is an example of a first determination processing. Then, when it is determined that the designated device information is stored in the data storage area 62B (S14: Yes), the terminal program 65 executes the execution preparing processing which is corresponding to the designated operation icon (S15).

The execution preparing processing is a processing of preparing the designated device to execute the designated operation. The execution preparing processing includes, for example, a processing of receiving designation of a designated data, a processing of receiving designation of an execution condition of the designated operation, or a processing of confirming an image of the execution result of the designated operation. The execution condition of the designated operation includes, for example, the number of the recording sheet on which an image is recorded by the printing operation, a reading resolution in the scan operation, and a FAX number of specifying the external device of the FAX transmission destination in FAX transmission operation.

As an example, when receiving the designation of the operation icon 121 through the user interface 54, and determining that the device information is stored in the data storage area 62B (S12: Operation icon and S14: Yes), the terminal program 65 executes the print preparing processing which is an example of the execution preparing processing. As another example, when receiving the designation of the operation icon 124 through the user interface 54, and determining that the designated device information is stored in a data storage area 62B (S12: Operation icon & S14: Yes), the terminal program 65 executes a FAX preparing processing which is an example of the execution preparing processing. The details of the print preparing processing and the FAX preparing processing will be described later with reference to FIGS. 6B and 7.

Also although not illustrated, the execution preparing processing in a case where the operation icon 122 is designated may be, for example, a processing of receiving designation of the reading resolution of the scan operation, or a processing of receiving designation of reserve destination of an image data generated by the scanning operation. Although not illustrated, the execution preparing processing in a case where the operation icon 123 is designated may be, for example, a processing of receiving designation of the reading resolution of the scanning operation, or designation of layout of the image recorded on the recording sheet by the printing operation (for example, 2 in 1).

On the other hand, when receiving designation of an operation icon through the user interface, and determining that the designated device information is not stored in a data storage area 62B (S12: Operation icon & S14: No), the terminal program 65 displays an non-selected notification screen 130 which is an example of a second screen on the display 53 (S16). Then, the terminal program 65 receives a user operation for the non-selected notification screen 130 through the user interface 54 (S17). The processing of step S16 is an example of a second display processing, and the processing of step S17 is an example of a reception processing.

Figure 10A:
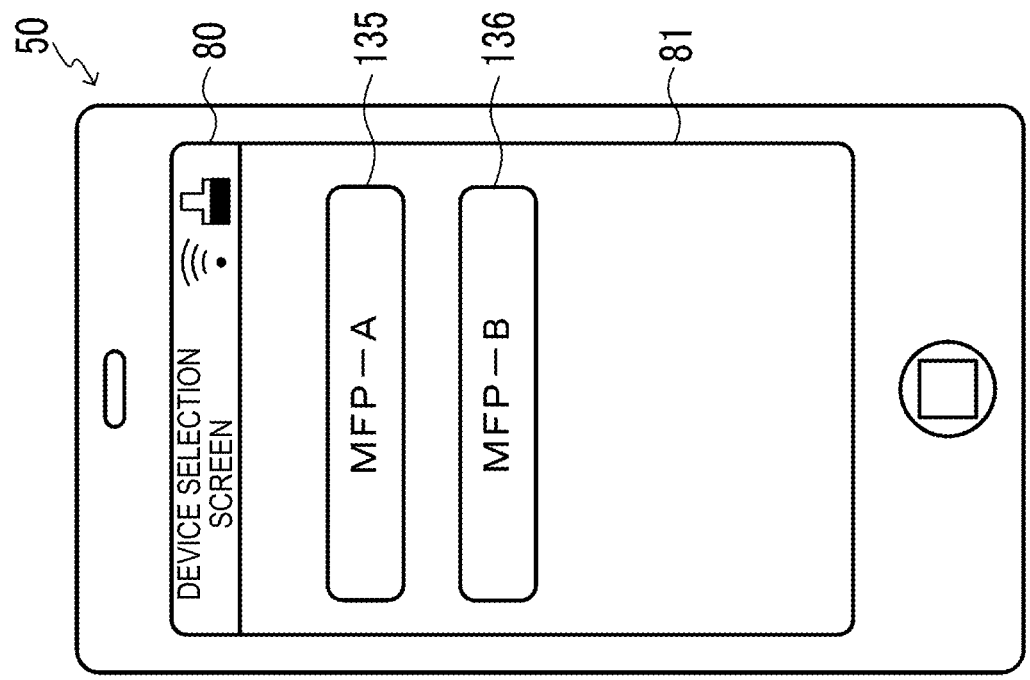
FIGS. 10A and 10B are a diagram showing a display example of the display 53.

FIG. 10A is showing a pop-up window which is superimposed over the main screen as an example of a non-selected notification screen 130. The non-selected notification screen 130 includes a message "There is a need to select an MFP. Do you want to select?", a "Select Now" icon 131, and a "Select Later" icon 132. The "Select Now" icon 131 is an example of the first object which is corresponding to selection of the designated device, and the "Select Later" icon 132 is an example of the second object which is corresponding to non-selection of the designated device.

Next, when receiving designation of "Select Now" icon 131 through the user interface 54 (S17: "Select Now" icon), the terminal program 65 execute the second device selection processing (S18). Then, the terminal program 65 executes processings of the step S11 and subsequent steps with using the designated device information newly stored in the data storage area 62 by the second device selection processing. On the other hand, when receiving designation of the "Select Later" icon 132 through the user interface 54 (S17: "Select Later" icon), the terminal program 65 executes processings of step S11 and subsequent steps, without executing the second device selection processing. The second device selection processing is an example of a second designation processing. The details of the second device selection processing will be described later with reference to FIG. 6A.

When receiving designation of the device icon 128 through the user interface 54 (S12: device icon), the terminal program 65 determines whether the designated operation ID is stored in the data storage area 62B (S19). As an example, in a case where the device icon 128 is designated after the one of the operation icons 121 to 124 or plug-in icons 126 and 127 is designated, it is determined that the designated operation ID is stored in step S19. As another example, in a case where the device icon 128 is designated before the operation icons 121 to 124 or the plug-in icons 126 and 127 are designated, it is determined that the designated operation ID is not stored in step S19. The processing of step S19 is an example of a second determination processing.

Then, when receiving designation of the device icon 128 through the user interface 54 and determining that the designated operation ID is not stored in a data storage area 62B (S12: device icon & S19: No), the terminal program 65 executes the first device selection processing (S20). The first device selection processing is an example of a first designation processing. The details of the first device selection processing will be described later with reference to FIG. 5. On the other hand, when receiving designation of the device icon 128 through the user interface 54 and determining that the designated operation ID is stored in a data storage area 62B (S12: device icon and S19: Yes), the terminal program 65 executes a second device selection processing (S21). Then, the terminal program 65 executes processing of the step S11 and subsequent steps with using the designated device information newly stored in the data storage area 62B in the first device selection processing or the second device selection processing.

[First Device Selection Processing]

The terminal program 65 searches a plurality of MFP 10 that communication is available through the network interface 55 and designation is available as the designated device (S31). Specifically, the terminal program 65 broadcasts, for example, the transmission request information to the communication network 101 through the network interface 55 by using SNMP (abbreviation for Simple Network Management Protocol). The transmission request information is information for requesting transmission of the device information which is stored in the MIB of a device where designating as the designated device is available. In other words, only the device where designating as the designated device is available returns the device information. Then, the terminal program 65 receives, from the MFP 10, the device information that the MFP 10 transmits as a response of the transmission request information through the network interface 55. In step S31 of the present embodiment, it is assumed that the portable terminal 50 receives the device information from the MFPs 10A and 10B. Incidentally, the device information received from the MFP 10 includes the operation ID of indicating an operation which the MFP 10 can execute. The processing of step S31 is an example of a reception processing. The search of the plurality of the MFP 10 that communication is available may be executed by other known methods.

Then, the terminal program 65 determines whether a plug-in is installed in the portable terminal 50 (S32). Then, when it is determined that the plug-in is installed (S32: Yes), the terminal program 65 specifies the MFPs 10A and 10B, which is capable of executing any one of operation and the second support operation, from the MFPs 10A and 10B which are the transmission source of the device information received in step S31 (S33). On the other hand, when it is determined that the plug-in is not installed (S32: No), the terminal program 65 specifies the MFP 10A, which is capable of executing one of the first support operations, from MFPs 10A and 10B (S34). The processing of step S32 is an example of the third determination processing, and the processings of steps S31, S33, and S34 are an example of a first specification processing.

As an example, in step S33, when any one of the first support operation ID and the second support operation ID is included in the device information received in step S31, the terminal program 65 may specify the MFP 10, which is transmission source of the device information, as a MFP 10 that any one of the first support operation and the second support operation can be executed. As another example, in step S31, the terminal program 65 may request the MFP 10 for the return of the device information including any one of the first support operation ID and the second support operation ID. Then, in step S33, the terminal program 65 may specify the MFP 10, which is transmission destination of the device information received in step S31, as the MFP 10 capable of executing one of the first support operation and a second support operation. The same processing may be executed in step S34.

Then, the terminal program 65 displays the device selection screen which is an example of the first selection screen on the display unit 53 (S35). Then, the terminal program 65 accepts the user operation with respect to the device selection screen through the manipulation unit 54 (S36). The processing of step S35 is an example of the first selection screen display processing, and the processing of step S36 is an example of a reception processing.

Figure 10B:
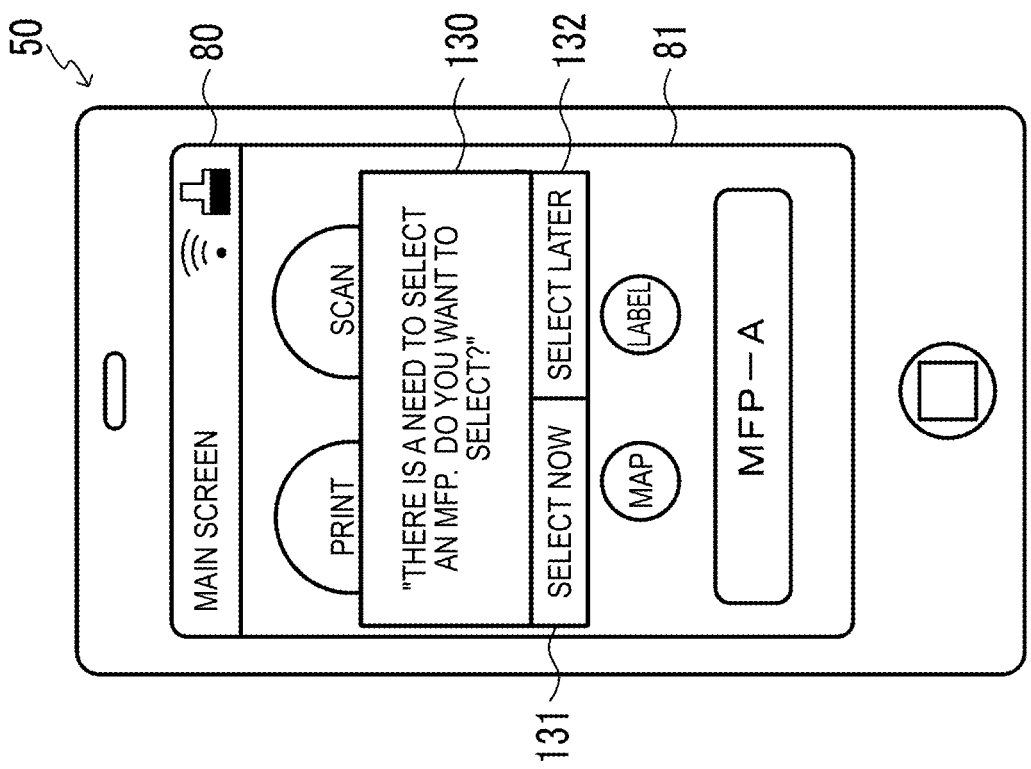
Figure 11A:
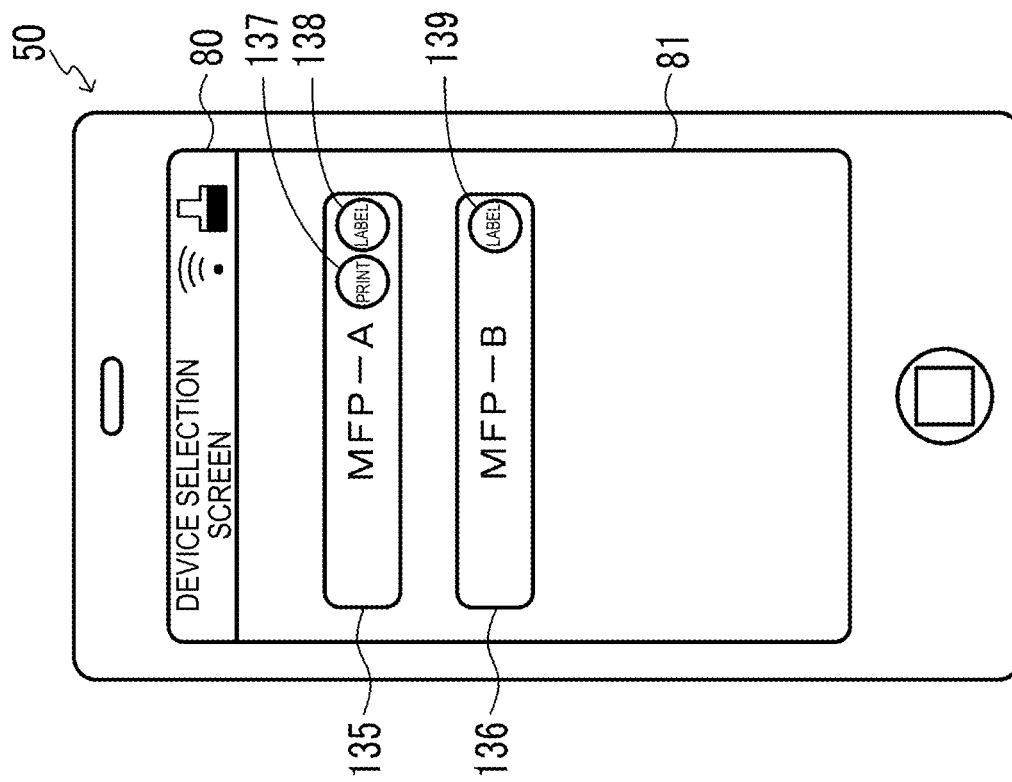
FIGS. 11A and 11B are diagrams showing a display example of a display 53.

FIG. 10B is showing an example of a device selection screen in a case where the MFPs 10A and 10B are specified in step S33. The device selection screen illustrated in FIG. 10B includes device icons 135 and 136. On the other hand, FIG. 11A is showing an example of a device selection screen in a case where only the MFP 10A is specified in step S34. The device selection screen illustrated in FIG. 11A includes only a device icon 135. The device icons 135 and 136 are corresponding to the MFPs 10A and 10B specified in steps S33, S34. Further, in the device icons 135 and 136, the device IDs of the corresponding MFP 10A and 10B are described.

Then, for example, when accepting designation of the device icon 136 through the manipulation unit 54 (S36: Yes), the terminal program 65 updates the designated device information already stored in the data storage area 62B to the device information of the MFP 10B corresponding to the device icon 136 (S37). The user operation of designating the device icon 136 is an example of a user operation of designating the MFP 10B as designated device. The processing of step S37 is an example of a first storing processing.

[Second Device Selection Processing]

The terminal program 65 searches a plurality of MFP 10 that can be specified as and designated devices can communicate through the network interface 55 (S41). Then, the terminal program 65 specifies the MFP 10 that can execute the designated operation (S42) among the MFPs 10A and 10B, which are the transmission source of the device information received in step S41. Then, the terminal program 65 displays the device selection window is an example of the second selection screen on the display unit 53 (S43). The device selection screen includes a device icon corresponding to the MFP 10 specified in step S42. The processing of step S41 is an example of a reception processing, processings of steps S41 and S42 are an example of a second specification processing, and the processing of step S43 is an example of a second selection screen display processing.

As an example, after the operation icon 121 is designated, i.e. in the second device selection processing in a case where the designated operation ID "Print" is stored, the terminal program 65 specifies only the MFP 10A, which is capable of executing an printing operation, from the MFPs 10A and 10B (S42). Then, as illustrated in FIG. 11A, the terminal program 65 displays the device selection screen including only the device icon 135 on the display 53 (S43).

As another example, after the operation icon 123 is designated, i.e. in the second device selection processing in a case where the designated operation ID "Copy" is stored, the terminal program 65 specifies only the MFP 10A, which is capable of executing both of the printing operation and the scanning operation, from the MFPs 10A and 10B (S42). Then, as illustrated in FIG. 11A, the terminal program 65 displays the device selection screen including only the device icon 135 on the display 53 (S43).

As another example, after the operation icon 124 is designated, i.e. in the second device selection processing in a case where the designated operation IDs "FAX transmission" and "FAX preview transmission" are stored, the terminal program 65 specifies only the MFP 10A, which is capable of executing at least one of the FAX transmission operation and the FAX preview transmission operation, from the MFPs 10A and 10B (S42). Then, as illustrated in FIG. 11A, the terminal program 65 displays the device selection screen including only the device icon 135 on the display 53 (S43).

As yet another example, after the plug-in icon 127 is designated, i.e. in the second device selection processing in a case where the designated operation IDs "Print" and "Label Print" are stored, the terminal program 65 specifies the MFP 10A, which is capable of executing all of the designated operations, and the MFP 10B, which is capable of executing only a part of the designated operation, from the MFPs 10A and 10B (S42). Then, as illustrated in FIG. 11B, the terminal program 65 displays the device selection screen including device icons 135 and 136 on the display 53 (S43).

Figure 11B:
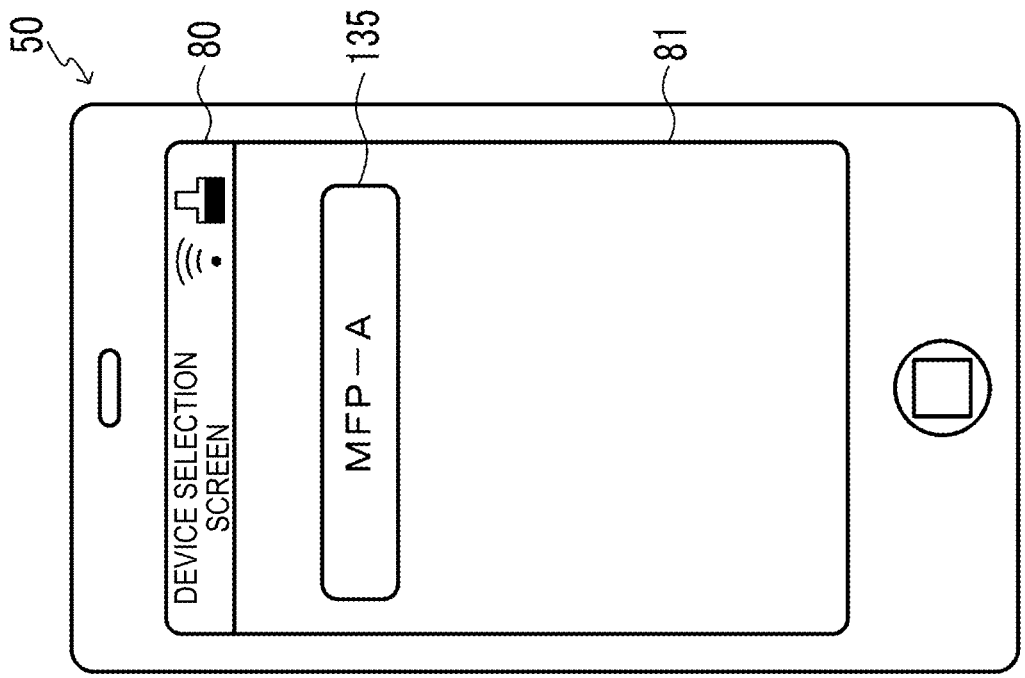

In the device selection screen as illustrated in FIG. 11B, the device icon 135 corresponding to the MFP 10A which is capable of executing all of the designated operations, is displayed above the device icon 136 corresponding to the MFP 10B which is capable of executing only a part of the designated operation. That is, the terminal program 65 preferentially displays the device icon 135, which is corresponding to the MFP 10A having a large number of the executable second support operation, compared to the device icon 136, which is corresponding to the MFP 10B having a small number of the executable second support operation.

Further, in the device selection screen illustrated in FIG. 11B, the operation identification images 137 and 138 are added to the device icon 135, and the operation identification image 139 is added to the device icon 136. The operation identification images 137 to 139 are images illustrating the second support operations that the corresponding MFPs 10A and 10B can execute. More specifically, the operation identification image 137 shows a printing operation and the operation identification images 138 and 139 show the label printing operation.

Then, for example, when receiving designation of the device icon 136 through the user interface 54 (S44: Yes), the terminal program 65 updates the designated device information already stored in the data storage area 62B to the device information of the MFP 10B corresponding to the device icon 136 (S45). The processing of step S45 is an example of a second storing processing.

The first device selection processing is a processing of prompting a user to designate the designated device in a status that the designated operation is not designated. On the other hand, the second device selection processing is a processing of prompting a user to designate the designated device in a status that the designated operation is designated. That is, the first device selection processing and the second device selection processing are common in that the designated device is selected by a user, and are different in whether the designated operation in the execution time of each processing is designated.

In the first device selection processing and the second device selection processing, for example, processings of steps S31 and S41, processings of steps S35 and S43, processings of steps S36 and S44, and processings of steps S37 and S45 may be common, respectively. More particularly, the device selection screen displayed in steps S35 and S45, the display mode of the screen layout and the device icons may be common. Further, the user operation received by steps S36 and S44 may be common.

[Print Preparing Process]

Figure 12A:
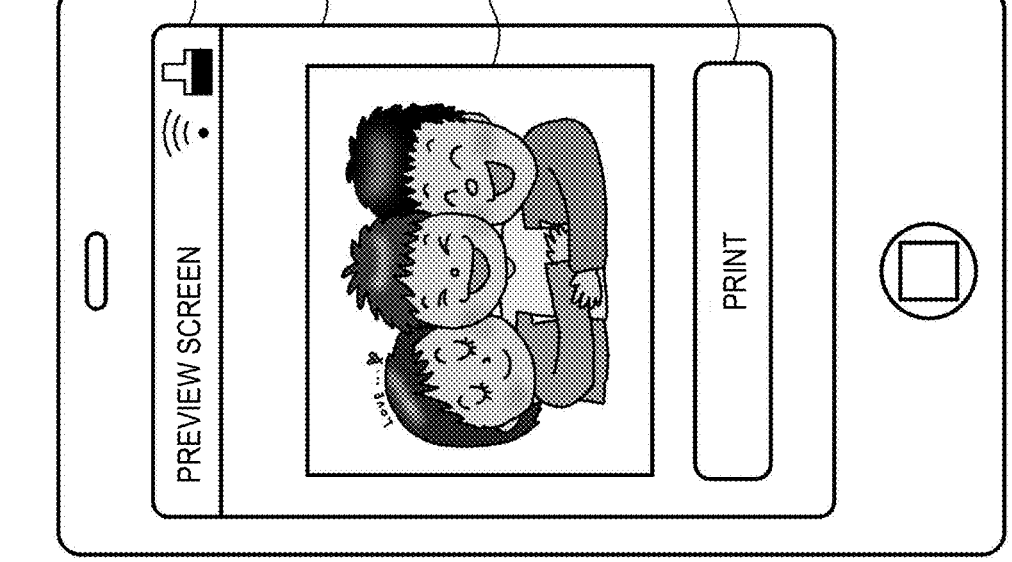
FIGS. 12A and 12B are diagrams showing a display example of a display 53.

First, the terminal program 65 displays the data selection screen on the display 53 (S51). FIG. 12A is a diagram showing an example of a data selection screen. The data selection screen illustrated in FIG. 12A includes a plurality of data icons 141, 142, and 143. The data icons 141 to 143 are corresponding to, for example, various types of data stored in the data folder, or various types of data stored in a server (not illustrated) on the Internet. Then, the terminal program 65 receives a user operation on the data selection screen through the user interface 54 (S52). The processing of step S52 is an example of a reception processing.

Then, for example, when receiving the designation of the data icon 141 through the user interface 54 (S52: Yes), the terminal program 65 determines the data "photograph.JPEG" which is corresponding to the data icon 141 as the designated data. A user operation for designating a data icon is an example of a user operation of designating the designated data. Then, the terminal program 65 displays a preview screen on the display 53 (S53). In addition, the terminal program 65 receives the user operation for the preview screen through the user interface 54 (S54). The processing of step S54 is an example of a reception processing.

Figure 12B:
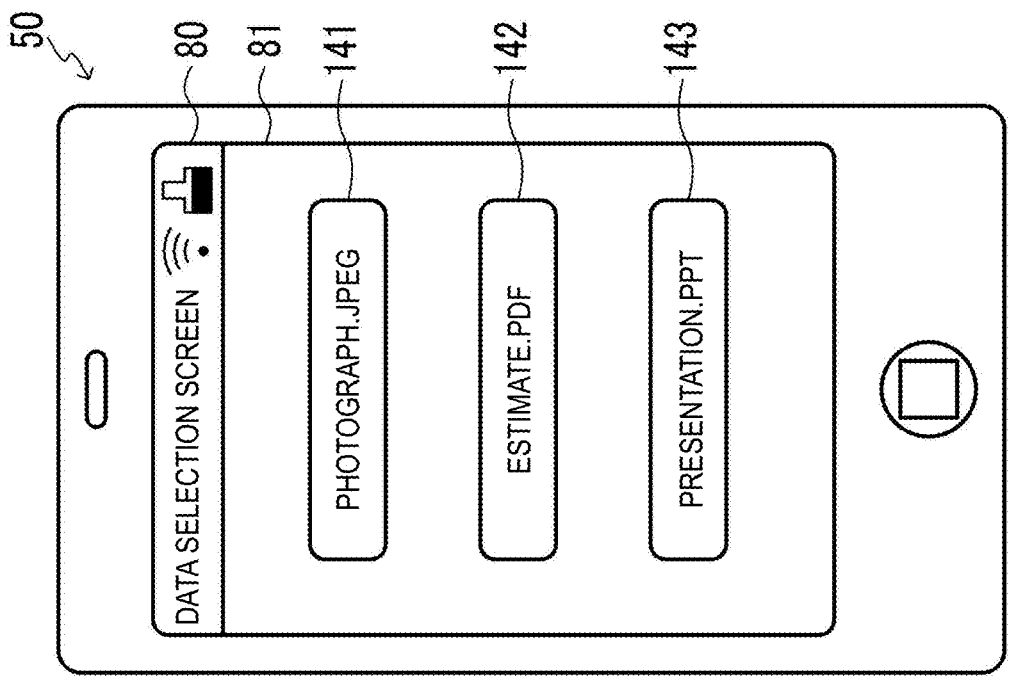

FIG. 12B is a diagram showing an example of a preview screen. The preview screen illustrated in FIG. 12B includes a preview image 145 and a "Print" icon 146. The preview image 145 is an image showing the result obtained by executing the designated operation which is corresponding to the designated data to the designated device. The preview image 145 according to the present embodiment shows an image obtained by recording an image represented by data "photograph.JPEG" on the recording sheet. The "Print" icon 146 is an example of an object of the execution instruction which is corresponding to the instruction to execute the designated operation. In other words, the "Print" icon 146 is corresponding to the instruction to execute the printing operation for the designated data to the designated device.

Then, when receiving the designation of the "Print" icon 146 through the user interface 54 (S54: Yes), the terminal program 65 transmits the print instruction information to the MFP 10A which is the designated device through the network interface 55 (S55). The print instruction information is information for executing the printing operation for the designated data. The print instruction information may include, for example, designated data, a designated data ID of identifying the designated data or, and an operation ID "print". A processing of step S55 is an example of an execution instruction processing.

Meanwhile, although not illustrated, a device program 35 of the MFP 10A receives the print instruction information from the portable terminal 50 through the network interface 25. Then, the device program 35 causes the printer 11 to execute a printing operation according to the received print instruction information. The file path or the URL of the designated data stored in the server is an example of the designated data ID

[FAX Preparing Processing]

Figure 13A:
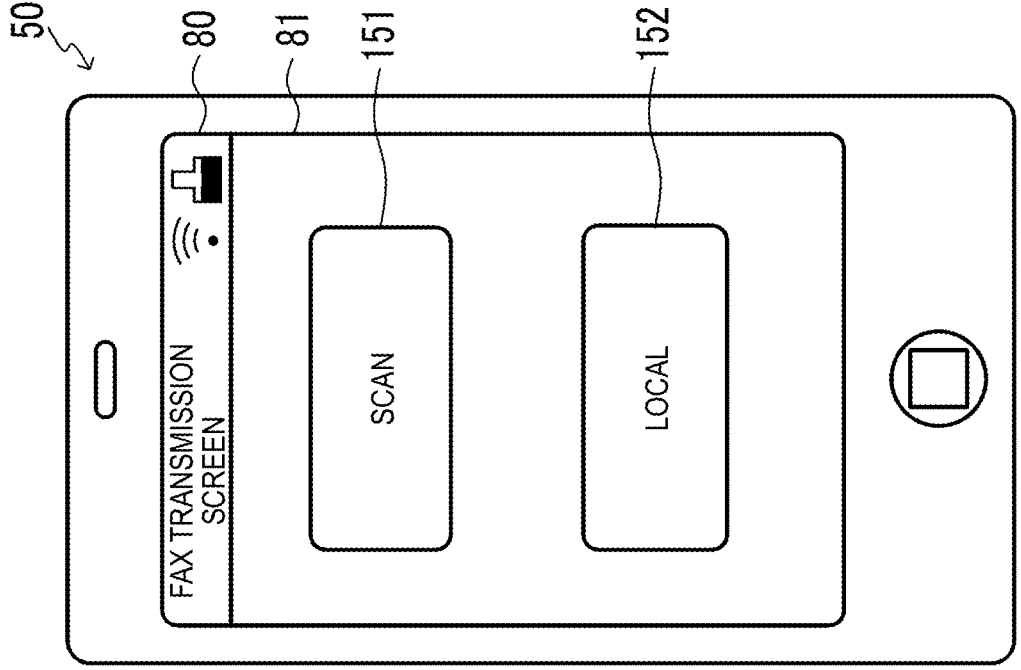
FIGS. 13A and 13B are diagrams showing a display example of a display 53.

Terminal program 65 displays the operation selection screen on the display 53 (S61). FIG. 13A is showing an example of the operation selection screen. The operation selection screen illustrated in FIG. 13A includes an act icon 148 and 149. The operation icon 148 is an example of the operation object corresponding to the FAX transmission operation, operation icons 149 is an example of the operation object corresponding to the FAX preview transmission operation. Then, the terminal program 65 receives a user operation on the operation selection screen through the user interface 54 (S62). The processing of step S62 is an example of a reception processing.

When a operation ID "FAX transmission" is included in the designated device information, the terminal program 65 sets an operation icon 148 to a form where the designation is available. On the other hand, when the operation ID "FAX transmission" is not included in the designated device information, the terminal program 65 sets the operation icon 148 to a form where the designation is not available (for example, gray-out, non-display). Similarly, when a operation ID "FAX preview transmission" is included in the designated device information, the terminal program 65 sets the operation icon 149 to a form where the designation is available. On the other hand, when a operation ID "FAX preview transmission" is not included in the designated device information, the terminal program 65 sets the operation icon 149 to a form where the designation is not available (for example, gray-out, non-display).

Then, when receiving the designation of the operation icon 148 in a form where the designation is available through the user interface 54 (S62: FAX transmission icon), the terminal program 65 temporarily stores the operation ID "FAX transmission" as operation ID in the storage area 62B. Then, the terminal program 65 displays the FAX transmission screen on the display 53 (S63). Then, the terminal program 65 receives a user operation for FAX transmission screen through the user interface 54 (S64). A processing of step S64 is an example of a reception processing.

Figure 13B:
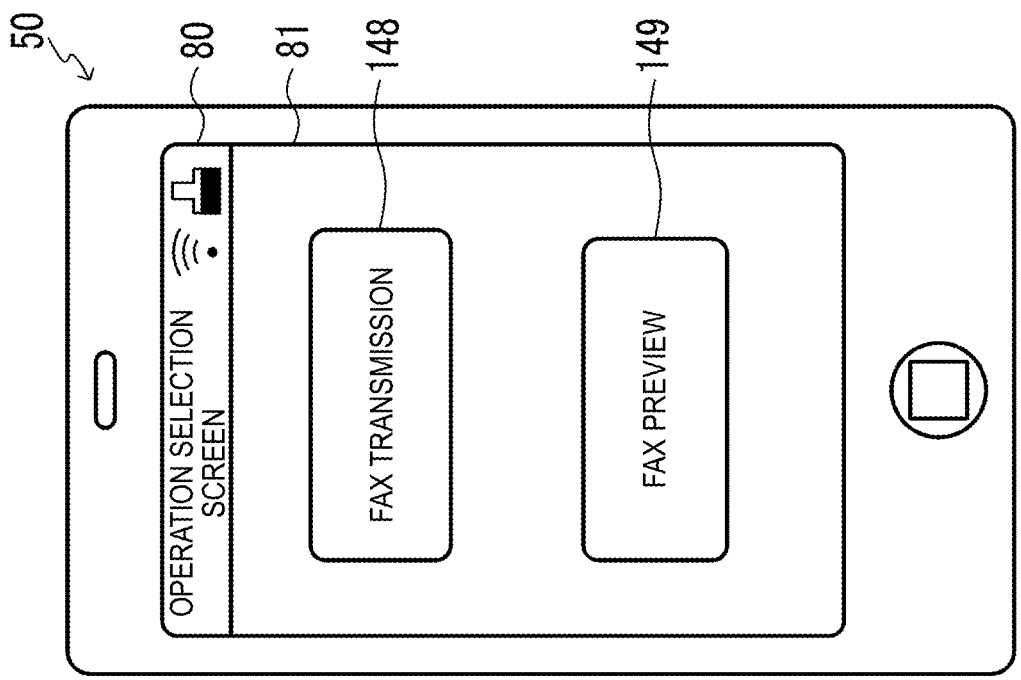
Figure 14A:
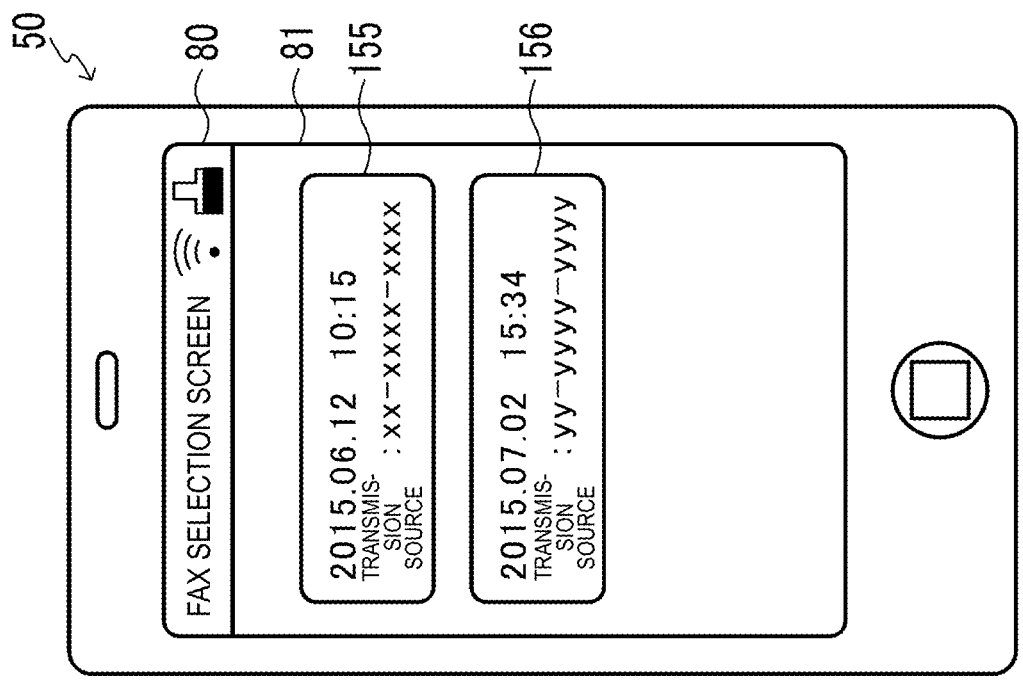
FIGS. 14A and 14B are diagrams showing a display example of a display 53.
Figure 14B:
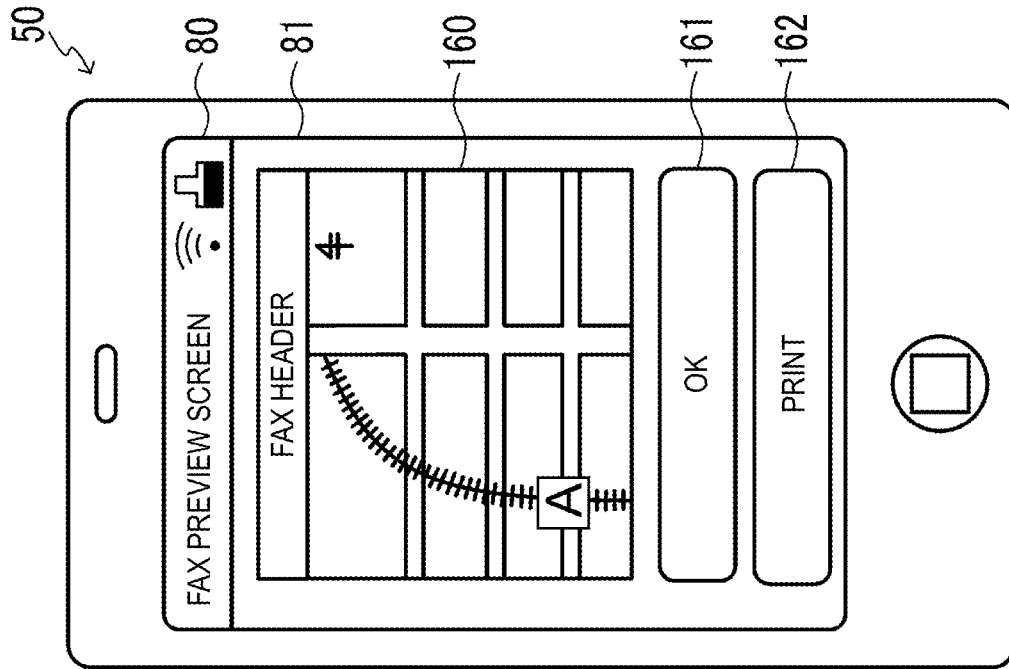

FIG. 13B is a diagram showing an example of a FAX transmission screen. The FAX transmission screen illustrated in FIG. 13B includes an acquisition source icon 151, 152. The acquisition source icon 151 causes the scanner 12 to execute a scanning operation, and is an example of the execution instruction object which is corresponding to the instruction to transmit the image data generated by the scanning operation to the FAX 13 with using FAX transmission. The acquisition source icon 152 is an example of an execution instruction object which is corresponding to the instruction to transmit the image data stored in the data storage area 62B to the FAX 13 with using FAX transmission.

When the operation ID "Scan" is included in the designated device information, the terminal program 65 sets the acquisition source icon 151 to a form where the designation is available. On the other hand, when the operation ID "Scan" is not included in the designated device information, the terminal program 65 sets the acquisition source icon 151 to a form where the designation is not available (for example, gray-out, non-display). On the other hand, the terminal program 65 always sets the acquisition source icon 152 to a form where the designation is available. Furthermore, the FAX transmission screen may further include an acquisition source icon which is corresponding to the instruction to acquire the image data stored in a server on the Internet, or the like.

Then, when receiving the designation of the acquisition source icon 151 in a form where the designation is available through the user interface 54 (S64: Scan icon), the terminal program 65 transmits FAX instruction information to the MFP 10A is the designated device through the network interface 55 (S67). The FAX instruction information is information for executing the FAX transmission operation for the designated data. The processing of step S67 is an example of the execution instruction processing.

The FAX instruction information transmitted by the designation of the acquisition source icon 151 includes a designation operation ID "FAX transmission" and the scan instruction information for instructing the execution of the scanning operation. That is, the FAX instruction information is information of causing the scanner to execute a scanning operation to 12 and causing the FAX 13 to execute a FAX transmission operation of designating the image data generated by the scanning operation as the designation data. Also although not illustrated, the terminal program 65 receives, through the operating unit 54, a user operation of designating the transmission destination information (for example, FAX number) for identifying an external device of the FAX transmission destination and allows FAX instruction information to be in the transmission destination information.

Meanwhile, although not illustrated, the device program 35 of the MFP 10A receives the FAX instruction information from the portable terminal 50 through the network interface 25. Then, device program 35 causes the scanner 12 to execute the scanning operation according to the scan instruction information included in the FAX instruction information. The scanner 12 reads out an image recorded on a document which is set on a contact glass or ADF (not illustrated), and generates image data representing the image. The device program 35 causes the FAX 13 to execute a FAX transmission operation for the image data generated by the scanning operation of the scanner 12. That is, FAX 13 transmits the image data generated by the scanning operation, with using FAX transmission, to the external device identified by the transmission destination information included in the FAX instruction information.

When receiving the designation of the acquisition source icon 152 through the user interface 54 (S64: Local icon), the terminal program 65 displays, for example, the data selection screen illustrated in FIG. 12A on the display 53 (S65). Then, the terminal program 65 receives a user operation on the data selection screen through the user interface 54 (S66). The processings of steps S65, S66 may be the same as the processings of steps S51, S52.

Then, for example, when receiving the designation of a data icon 141 through the user interface 54 (S66: Yes), the terminal program 65 determines the data "photograph.JPEG" which is corresponding to the data icon 141 as the designated data. Then, the terminal program 65 transmits FAX instruction information to the MFP 10A which is the designated device through the network interface 55 (S67). The FAX instruction information to be transmitted by the designation of the acquisition source icon 152 includes designated data or a designated data ID, an operation ID "FAX transmission", and transmission destination information.

Meanwhile, although not illustrated, a device program 35 of the MFP 10A receives the FAX instruction information from the portable terminal 50 through the network interface 25. Then, device program 35 causes the FAX 13 to execute the FAX transmission operation according to the FAX instruction information. That is, FAX 13 transmits the designated data included in FAX instruction information or the designated data identified by the designated data ID included in the FAX instruction information, to the external device which is identified by the transmission destination information included in the FAX instruction information.

When receiving the designation of an operation icon 194 through the user interface 54 (S62: FAX preview icon), the terminal program 65 receives a plurality of FAX specification information included in the FAX list which is stored in the MFP 10A, from the MFP 10A which is the designated device through the network interface 55 (S68). More specifically, the terminal program 65 transmits the transmission request information of requesting the transmission of the FAX specification information to the MFP 10A through the network interface 55. Then, the terminal program 65 receives the FAX specification information which is transmitted in response to the transmission request information, from the MFP 10A through the network interface 55. Then, the terminal program 65 temporarily stores the received FAX specification information in the data storage area 62B.

Then, the terminal program 65 displays the FAX selection screen on the display 53 (S69). FIG. 13A is a diagram showing an example of the FAX selection screen. The FAX selection screen illustrated in FIG. 13A includes a plurality of FAX icons 155, 156. The FAX icons 155 and 156 are an example of the execution instruction object which is corresponding to the FAX preview transmission operation. The FAX icons 155 and 156 are respectively corresponding to a plurality of FAX specification information received in step S78. In addition, in the FAX icons 155 and 156, reception date and time, and the transmission source telephone number which are included in the corresponding FAX specification information are described. Then, the terminal program 65 receives a user operation for FAX selection screen through the user interface 54 (S70). The processing of step S70 is an example of a reception processing.

Then, for example, when receiving the designation of a FAX icon 155 through the user interface 54 (S70: Yes), the terminal program 65 transmits the transmission instruction information, through the network interface 55, to the MFP 10A which is the designated device (S71). The transmission instruction information is an example of the execution instruction information that instructs the transmission of the FAX data 1 specified by FAX specification information which is corresponding to the FAX icon 155. The transmission instruction information includes, for example, an operation ID "FAX preview Email" and a data ID "001" included in the FAX specification information which is corresponding to the FAX icon 155. Process of step S71 is an example of the execution instruction processing.

Meanwhile, although not illustrated, a device program 35 of the MFP 10A receives the transmission instruction information from the portable terminal 50 through the network interface 25. Then, the device program 35 reads out FAX data 1 which is identified by the data ID "001" included in the transmission instruction information from the FAX list, and transmits the FAX data 1 to the portable terminal 50 through the network interface 25.

Next, the terminal program 65 receives the FAX data 1 from the MFP 10A through the network interface 55 (S72: Yes). Then, the terminal program 65 displays the FAX preview screen on the display 53 (S73). FIG. 13B is a diagram showing an example of the FAX preview screen. The FAX preview screen illustrated in FIG. 13B includes a FAX image 160 and operation icons 161, 162. Then, the terminal program 65 receives a user operation for the FAX preview screen through the user interface 54 (S74). The processing of step S74 is an example of a reception processing.

The FAX image 160 is an image which is represented by the FAX data 1 received in step S72. Further, in the FAX header included in FAX image 160, for example, reception date and time, and the transmission source telephone number which are included in the corresponding FAX specification information are included. The operation icon 161 is corresponding to the instruction of ending the display of the FAX preview screen. The operation icon 162 is an example of an execution instruction object which is corresponding to the execution instruction of the printing operation for FAX data 1. When the operation ID "Print" is included in the designated device information, the terminal program 65 sets the operation icon 162 to a form where the designation is available. On the other hand, when a operation ID "Print" is not included in the designated device information, the terminal program 65 sets the operation icon 162 to a form where the designation is not available (for example, grayout, non-display).

Then, when receiving the designation of the operation icon 161 through the user interface 54 (S74: OK icon), the terminal program 65 ends the display of the FAX preview screen. On the other hand, when receiving the designation of the operation icon 162 of a form where the designation is available through the user interface 54 (S74: Print icon), the terminal program 65 transmits the print instruction information, through the network interface 55, to the MFP 10A which is the designated device (S75). The print instruction information may include, for example, the operation ID "Print" and the FAX data 1 which is the designated data or the designated data ID of identifying FAX data 1. The processing of step S75 and the processing of the MFP 10A that receives the print instruction information may be the same as step S55.

Although not illustrated, for example, when the plug-in icon 126 is designated, the terminal program 65 executes the plug-in API in step S15 and activates a map program 66 corresponding to the designated plug-in icon 126. As a result, the OS 64 executes the terminal program 65 in the background and executes the map program 66 in the foreground. The same processing may be executed also when the plug-in icon 127 is designated.

The map program 66 acquires, for example, the map image data including the current position of the portable terminal 50 which is acquired from the GPS through the network interface 55. Specifically, the map program 66 requests the map image data to the server through the network interface 55 and receives the map image data returned from the server through the network interface 55. Then, the map program 66 displays a map designation screen on the display 53. The map designation screen includes, for example, a map image represented by the map image data which is obtained from the server, a "Print" icon, and a "FAX transmission" icon.

Then, map program 66 receives user operation for the map designation screen through the user interface 54. When receiving the user operation at the position of the map image through the user interface 54, the map program 66 changes the map image which is displayed on the map designation screen. The map program 66 acquires the map image data representing the changed map image from the server. The map image displayed on the map designation screen, for example, is slid according to the slide operation, is reduced according to the pinch-in operation, and is expanded according to the pinch-out operation.

When receiving designation of the "Print" icon through the user interface 54, the map program 66 temporarily stores a map image data representing the map image which is illustrated on the maps designation screen in the data storage area 62B as the designated data to storage. Then, map program 66 provide a designated data ID and the designated operation ID "Print" that identifies the map image data, which is temporarily stored, to the terminal program 65 as the return value of the plug-in API. A file name or a file path is an example of the designated data ID. On the other hand, when the "FAX transmission" icon is designated, the designated operation ID "FAX transmission" in place of the designated operation ID "Print" is provided to the terminal program 65 as a return value of the plug-in API.

As a result, the OS 64 ends the map program 66, executes again the terminal program 65 in the foreground. In addition, the terminal program 65 acquires the designated data ID and the designated operation ID from the map program 66 as the return value of the plug-in API. Then, the terminal program 65 causes the designated device, which is identified by the device ID included in the designated device information, to execute the designated operation that is identified by the designated operation ID obtained from the map program 66, with respect to the designated data that is identified by the designated data ID acquired from the map program 66. Further, the terminal program 65 may display a preview screen on the display 53, prior to executing the designated operation to the designated device.

[External Activation Process]

When receiving a user operation of designating a program icon 112 of the menu screen illustrated in FIG. 9A through the user interface 54, the map program 66 can execute the aforementioned processings which are activated by the OS 64. Then, when receiving designation of the "Print" icon through the user interface 54, the map program 66 activates the terminal program 65 by executing an explicit shared API that designated data ID and the designated operation ID "Print" are used as arguments. When receiving designation of the "FAX transmission" icon through the user interface 54, the map program 66 activates the terminal program 65 by executing an explicit shared API that the designated data ID and the designated operation ID "FAX transmission" are used as arguments.

Figure 8:
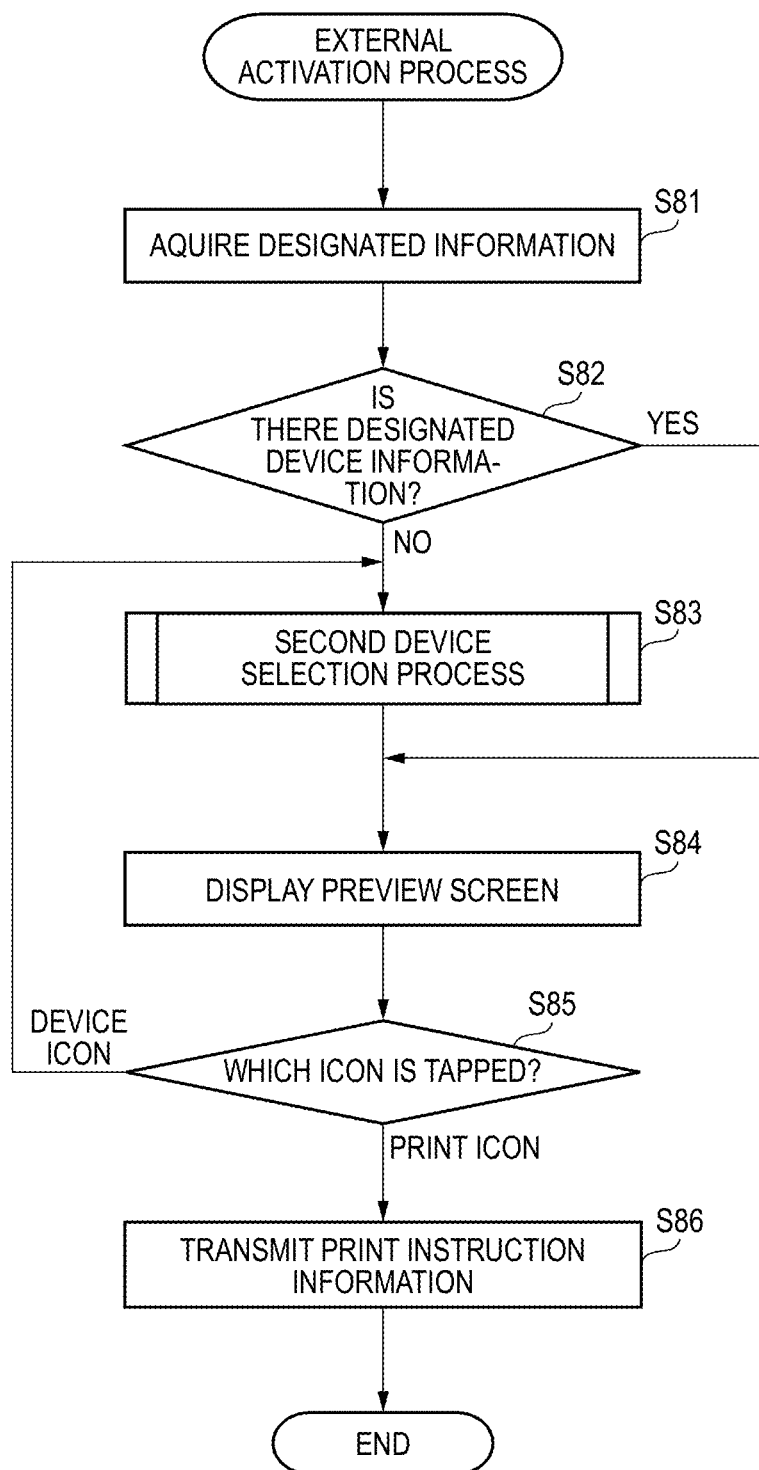
FIG. 8 is a flow chart of an external activating processing.

As a result, the OS 64 ends the map program 66 and executes the terminal program 65 in the foreground. The terminal program 65, which is activated from the map program 66 due to a user operation to the map program 66, executes the external activation processing illustrated in FIG.8. The designation of "Print" icon or "FAX transmission" icon is an example of a user operation to the map program 66 of instructing activation of the terminal program 65. Referring to FIG. 8, details of the external activation processing will be described. The external activation processing, instead of explicitly shared API, may be executed when being activated by a plug-in API that is developed by the provider of the terminal program 65.

First, the terminal program 65 acquires the designated data ID and the designated operation ID, which are designated in the arguments of the API that the map program 66 executes, as designated information (S81). Then, the terminal program 65 temporarily stores the designated data ID and the designated operation ID which are acquired, in the data storage area 62B. Here, it is assumed that the designated operation ID "Print" is acquired. Then, the terminal program 65 determines whether the designated device information is stored in the data storage area 62B (S82). The processing of step S81 is an example of the acquisition processing, and the processing of step S82 is an example of a first determination processing.

Then, when it is determined that the designated device information is stored (S82: Yes), the terminal program 65 displays the preview screen which is an example of the third screen on the display 53 (S84). Then, the terminal program 65 receives the user operation for the preview screen through the user interface 54 (S85). The processing of step S84 is an example of a third display processing, and the processing of step S85 is an example of a reception processing. On the other hand, when it is determined that the designated device information is not stored (S82: No), the terminal program 65 executes the second device selection processing prior to the third display processing (S83).

Figure 15:
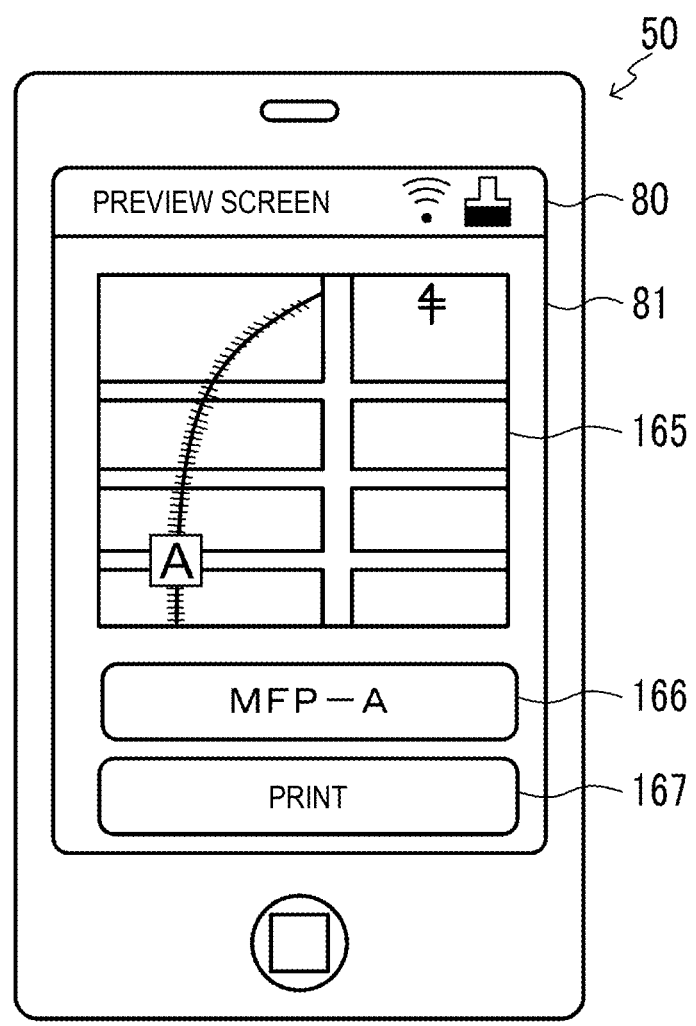
FIG. 15 is a diagram showing a display example of a preview screen in an external activating processing.

FIG. 15 is showing an example of a preview screen in the external activation processing. The preview screen illustrated in FIG. 15 includes a preview image 165, a device icon 166, and a "Print" icon 167. The preview image 165 is an image representing a result obtained by causing the designated device, which is identified by the device ID included in the designated device information, to execute the designated operation, which is identified by the designated operation ID acquired in step S81, with respect to the image data that is identified by the designated data ID obtained in step S81. The device icon 166 is an example of a device designation object. The "Print" icon 167 is an example of the execution instruction object corresponding to the execution instruction of printing operation that is the designated operation. The screen layout of the preview screen in the external activation processing differs from the screen layout of the preview screen in the standard activation processing in that a device icon 166 is included.

Then, when receiving designation of the device icon 166 through the user interface 54 (S85: Device icon), the terminal program 65 executes processings of the step S83 and subsequent steps. On the other hand, when receiving designation of the "Print" icon 167 through the user interface 54 (S85: "Print" icon), the terminal program 65 transmits the print instruction information to the designated device through the network interface 55 (S86). The processing of step S86 is an example of the execution instruction processing and may be the same as the processing of step S55.

According to the above embodiment, a first device selection processing is executed by designating the device icon 128 before designating the designated operation. Thus, it is possible to provide a first guide line for instructing a designated operation of the designated device which is selected from among a rich choice. On the other hand, by designating the operation icon after designating the designated device, or by designating the operation icons 121 to 124, the plug-in icons 126 and 127 prior to designating the designated device, the second device selection processing is executed. Thus, it is possible to provide a second guide line for instructing the designated operation of the designated device which is suitable for the designated operation.

That is, the user can use properly a first guide line and a second guide line by intuitive operation of firstly designating any one of the device icon 128, the operation icons 121 to 124, or the plug-in icons 126 and 127, the first guide line is suitable for the user who is operating the terminal program 65 considering that any one of the designated devices is selected and the second guide line is suitable for the user who is operating the terminal program 65 considering the operation to be executed by the designated device.

According to the above embodiment, operation icons 121 to 124 included in the main screen are updated based on the designated device information which is updated by the first device selection processing or the second device selection processing. That is, when the designated device is switched, a new designated device can provide a guide line for causing the user to use an executable operation. That is, a guide line, which guides all operations that the new designated device can execute, can be provided to the user who designates a designated device through the first guide line. Further, although the designated device is designated through the first guide line, when the operation icons 121 to 124, which are corresponding to operations that the user wants to use to be utilized, are not displayed, the first guide line for changing the designated device can be provided again. On the other hand, a guide line, which guides the designated operation that is already designated and guides other operations that a new designated device can execute, can be provided to the user who selects the designated device through the second guide line.

According to the above embodiment, in the first device selection processing and the second device selection processing, the display layout and the like of the device selection screen is shared. Thus, it is possible to provide the same with using convenience to a user who is selecting a designated device through the first guide line, and to a user who is selecting a designated device through the second guide line. That is, even when a user who uses one guide line uses other guide line, it is possible to provide with using convenience without any discomfort.

According to the above embodiments, it is possible to provide a flexible second guide line that the user may choose immediately or later the designated device, which is capable of executing a desired operation, by a user operation on the non-selected notification screen.

According to the above embodiments, the device icon, which is corresponding to an MFP 10 that at least one of the first support operation and a second support operation can execute, is displayed on the device selection screen of the first device selection processing. Accordingly, it is possible to cause a user to designate a designated device, which is capable of executing at least one of the first support operation and the second support operation, through the first guide line.

According to the above embodiment, in the second device selection processing in a case where the plug-in icon is designated, it is possible to cause a user to preferentially select the designated device which is capable of executing a second support operation a lot. Accordingly, it is possible to provide a third guide line suitable for causing the designated device to execute the operation for image data which is designated through the plug-in. Further, according to the above embodiment, in the device selection screen of the second device selection processing, the operation identification images 137 to 139 are added to the device icons 135 and 136. Thus, after a user recognizes the second support operation which the corresponding MFP 10 can execute, it is possible to provide a third guide line suitable for selection of the designated device.

However, in steps S41 and S42, the terminal program 65 may specify only an MFP 10 which is capable of executing all of the plurality of designated operation. Then, the terminal program 65 may cause a user to designate one of the MFPs 10, which is capable of executing all of the plurality of designated operations, as the designated device. On the other hand, in steps S41, S42, in a case where an MFP, which is capable of executing all of the designated operation, does not exist, the terminal program 65 may specify the MFPs 10 capable of executing a portion of the plurality of designated operation. Then, the terminal program 65 may cause a user to designate one of the MFPs 10, which is capable of executing a portion of the plurality of designated operations, as the designated device.

According to the above embodiment, when the external activation processing is executed in a status that the designated device information is not stored, the second device selection processing is executed prior to the third display processing. Thus, it is possible to provide a fourth guide line suitable for prompting a user to preferentially select the designated device capable of executing an operation which is supported by cooperation with a terminal program 65 and an activation source program.

In the MFP 10 and the portable terminal 50 of the above embodiment, various programs stored in program storage areas 32A and 62A of the storages 32 and 62 are executed by CPUs 31 and 61, an example in which each processing that the control unit of this disclosure executes is realized will be described. However, the configuration of the control unit is not limited thereto, some or all of the control unit may be realized by hardware such as an integrated circuit (also referred to as IC).

Furthermore, this disclosure can be realized not only as the MFP 10 and the portable terminal 50 but also may be realized as a program of causing the MFP 10 and the portable terminal 50 to execute processings. Then, the program may be provided by being recorded in non-transitory recording medium. The non-transitory recording medium includes a CD-ROM, a DVD-ROM, and a storage included in a server which can be connected to the MFP 10 and the portable terminal 50 through the communication network 101. The program stored in the storage of the server may be distributed through a communication network 101 such as the Internet in the form of information or signal representing the program.

What is claimed is:

1. A non-transitory computer-readable medium storing instructions to control a portable terminal, which has a network interface, a display, a user interface, and a storage, the instructions being capable of instructing at least one processing for image data to an image processing device having an execution unit capable of executing a processing for image data, the instructions causing the portable terminal to perform processes comprising:

an operation screen display process of displaying, in both a case where device identification information for identifying a designated device is stored in the storage and a case where the device identification information for identifying the designated device is not stored in the storage, an operation screen including both a device designation object and a plurality of processing objects on the display, each of the device designation object and the plurality of processing objects on the display being selectable by the user interface, wherein a designated device is a device being a target of instructing of the processing by the instruction, the device designation object is corresponding to designation of the designated device, and a plurality of processing objects is respectively corresponding to a plurality of processing which can be instructed by the instructions;

wherein the instructions cause the portable terminal to perform processes comprising:

a receiving process of, in response to receiving an operation to designate a processing object in the operation screen including both the device designation object and the plurality of processing objects on the display by the user interface in the case where the device identification information for identifying the designated device is not stored in the storage, receiving an operation to designate an image processing device as the designated device and storing, as a device storing information of the designated device, a device identification information of the image processing device designated by the receiving process, into the storage; and wherein the instructions cause the portable terminal to perform processes comprising:

an execution preparing process of, in response to receiving the operation that designates a processing object in the case where the device identification information for identifying the designated device is stored in the storage, preparing an execution of an operation corresponding to a designated processing object, by the designated device.

2. The non-transitory computer-readable medium according to claim 1, wherein the instructions cause the portable terminal to perform processes comprising:

a reception process of receiving a processing identification information from the designated device through the network interface, wherein the processing identification information is information for identifying an operation which the designated device is capable of executing;

displaying, in the operation screen display process, the operation screen including the processing object, which is corresponding to the processing identification information received by the reception process, among the processing objects which is to be displayed on the display, on the display; and performing again the operation screen display process after the designating processing is executed.

3. The non-transitory computer-readable medium according to claim 1, wherein a screen layout and a display status of the device object are common to a first selection screen and a second selection screen, and wherein the operation of designating the device object is common to the designating processing.

4. The non-transitory computer-readable medium according to claim 1, wherein the instructions cause the portable terminal to perform:

displaying a second screen on the display, when the operation of designating the processing object is received by the receiving process and it is determined that the device identification information is not stored, wherein the second screen includes a first object which is corresponding to selection of the designated device and a second object which is corresponding to non-selection of the designated device;

performing, when the operation of designating the first object is received by the receiving process, the designating processing; and performing, when the operation of designating the second object is received by the receiving process, the operation screen display process.

5. The non-transitory computer-readable medium according to claim 4, wherein the instructions cause the portable terminal to perform:

storing the processing identification information of identifying the designated operation in the storage when the operation for designating the processing object is received by the receiving process;

determining whether the processing identification information is stored in the storage;

performing, when the operation for designating the device designation object is received by the receiving process and it is determined that the processing identification information is stored by the designating processing.

6. The non-transitory computer-readable medium according to claim 1, wherein the instructions cause the portable terminal to perform:

specifying, in the first specification processing, the image processing device, which is capable of executing at least one of a plurality of first support operations, as a device where designating as the designated device is available, among the image processing devices in which communication is available through the network interface, wherein the first support operation is an operation where the execution preparing process is executable.

7. The non-transitory computer-readable medium according to claim 6, wherein the instructions cause the portable terminal to perform:

determining whether an external instructions, which notifies the instructions of data identification information of identifying the designated image data, is stored in the storage;

specifying, in a case where it is determined that the external instructions is not stored, the image processing device, which is capable of executing at least one of the plurality of first support operations, as a device where designating as the designated device is available; and specifying, in a case where it is determined that the external instructions is stored, the image processing device, which is capable of executing at least one of the plurality of first support operations and second support operations, as a device where designating as the designated device is available, wherein the second support operation is an operation which the external instructions causes the designated device to execute.

8. The non-transitory computer-readable medium according to claim 7,
wherein the operation screen is capable of including a plug-in object which is the processing object corresponding to the external instructions, and the external instructions is capable of causing the designated device to execute the plurality of second support operation, and
wherein the instructions cause the portable terminal to perform:
specifying, in a case where a plug-in object is designated, the image processing device capable of executing all of the plurality of second support operation, as a device where designating as the designated device is available.

9. The non-transitory computer-readable medium according to claim 7,
wherein the operation screen is capable of including a plug-in object which is the processing object corresponding to the external instructions, and the external instructions is capable of causing the designated device to execute the plurality of second support operation,
wherein the instructions cause the portable terminal to perform:
specifying, in a case where a operation of designating the plug-in object is received by the user interface, the image processing device capable of executing at least one of the plurality of second support operation; and
displaying, the device object, as priority, corresponding to the image processing device having a large number of second support operations which are executable.

10. The non-transitory computer-readable medium according to claim 9,
wherein the instructions cause the portable terminal to perform:
adding, an image that represents the second support operation executable by the corresponding image processing device, to the device object.

11. The non-transitory computer-readable medium according to claim 1,
wherein the operation screen is capable of including a combined processing object which is the processing object corresponding to a combined operation in which the first operation and a second operation are combined, and
wherein the instructions cause the portable terminal to perform processes comprising:
specifying, in a case where the combined processing object is designated, the image processing device capable of executing both of the first operation and the second operation.

12. The non-transitory computer-readable medium according to claim 1,
wherein the operation screen includes an inclusion object which is the processing object corresponding to both of a third operation and a fourth operation, and
wherein the instructions cause the portable terminal to perform:
specifying, in a case where the inclusion object is designated, the image processing device capable of executing at least one of the third operation and the fourth operation.

13. The non-transitory computer-readable medium according to claim 1,
wherein when the instructions are activated from activation source instructions due to the operation to the activation source instructions, the instructions cause the portable terminal to perform:
obtaining data identification information of identifying image data designated by a user and processing identification information of identifying the designated operation from the activation source program; and
performing the first determination processing,
wherein the instructions cause the portable terminal to perform:
displaying a third screen on the display, when it is determined that the device identification information is stored, wherein the third screen includes a preview image indicating a result obtained by causing the designated device to execute the designated operation which is identified by the processing identification information with respect to the image data which is identified by the data identification information; and
performing, when it is determined that the device identification information is not stored, the designating processing prior to said displaying.

14. The non-transitory computer-readable medium according to claim 1,
wherein the instructions cause the portable terminal to perform processes comprising:
displaying an execution instruction object corresponding to an execution instruction of the designated operation on the display in the execution preparing process; and
an execution instruction processing of transmitting an execution instruction information to the designated device through the network interface, when the operation of designating the execution instruction object is received by the receiving process, wherein the execution instruction information is information for instructing an execution of the designated operation.

15. A portable terminal, which has a network interface, a display, a user interface, and a storage, the portable terminal being capable of instructing at least one processing for image data to an image processing device having an execution unit capable of executing a processing for image data, the portable terminal performing processes comprising:
an operation screen display process of displaying, in both a case where device identification information for identifying a designated device is stored in the storage and a case where the device identification information for identifying the designated device is not stored in the storage, an operation screen including both a device designation object and a plurality of processing objects on the display, each of the device designation object and the plurality of processing objects on the display being selectable by the user interface, wherein a designated device is a device being a target of instructing of the processing by the instruction, the device designation object is corresponding to designation of the designated device, and a plurality of processing objects is respectively corresponding to a plurality of processing which can be instructed by the instructions;
wherein the portable terminal performs processes comprising:
a receiving process of, in response to receiving an operation to designate a processing object in the operation screen including both the device designation object and the plurality of processing objects on the display by the user interface in the case where the device identification information for identifying the designated device is not stored in the storage, receiving an operation to designate an image processing device as the designated device and storing, as a device storing information of the designated device, a device identification information of the image processing device designated by the receiving process, into the storage; and wherein the portable terminal performs processes comprising:

an execution preparing process of, in response to receiving the operation that designates a processing object in the case where the device identification information for identifying the designated device is stored in the storage, preparing an execution of an operation corresponding to a designated processing object, by the designated device.

16. A method of controlling a portable terminal, which has a network interface, a display, a user interface, and a storage, the method being capable of instructing at least one processing for image data to an image processing device having an execution unit capable of executing a processing for image data, the method comprising:

displaying, in both a case where device identification information for identifying a designated device is stored in the storage and a case where the device identification information for identifying the designated device is not stored in the storage, an operation screen including both a device designation object and a plurality of processing objects on the display, each of the device designation object and the plurality of processing objects on the display being selectable by the user interface, wherein a designated device is a device being a target of instructing of the processing by the instruction, the device designation object is corresponding to designation of the designated device, and a plurality of processing objects is respectively corresponding to a plurality of processing which can be instructed by the instructions;

receiving, in response to receiving an operation to designate a processing object in the operation screen including both the device designation object and the plurality of processing objects on the display by the user interface in the case where the device identification information for identifying the designated device is not stored in the storage, an operation to designate an image processing device as the designated device and storing, as a device storing information of the designated device, a device identification information of the image processing device designated by the receiving, into the storage; and preparing, in response to receiving the operation that designates a processing object in the case where the device identification information for identifying the designated device is stored in the storage, an execution of an operation corresponding to a designated processing object, by the designated device.

* * * * *